United States Patent
Jin et al.

(10) Patent No.: US 9,563,383 B2
(45) Date of Patent: Feb. 7, 2017

(54) STORAGE SYSTEM WITH PRIMARY AND SECONDARY DATA STORAGE GROUPS AND CONTROL METHOD THEREOF

(71) Applicant: Hitachi, Ltd., Tokyo (JP)

(72) Inventors: Azusa Jin, Tokyo (JP); Tomohiro Kawaguchi, Tokyo (JP); Hideo Saito, Tokyo (JP); Akira Deguchi, Tokyo (JP); Tomohiro Yoshihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 87 days.

(21) Appl. No.: 14/426,565

(22) PCT Filed: May 12, 2014

(86) PCT No.: PCT/JP2014/062593
§ 371 (c)(1),
(2) Date: Mar. 6, 2015

(87) PCT Pub. No.: WO2015/173859
PCT Pub. Date: Nov. 19, 2015

(65) Prior Publication Data
US 2016/0259559 A1 Sep. 8, 2016

(51) Int. Cl.
*G06F 12/00* (2006.01)
*G06F 13/00* (2006.01)
(Continued)

(52) U.S. Cl.
CPC .............. *G06F 3/065* (2013.01); *G06F 3/06* (2013.01); *G06F 3/0619* (2013.01); *G06F 3/0683* (2013.01); *G06F 12/00* (2013.01)

(58) Field of Classification Search
None
See application file for complete search history.

(56) References Cited

U.S. PATENT DOCUMENTS

| | | | | |
|---|---|---|---|---|
| 2005/0022213 A1* | 1/2005 | Yamagami | .......... | G06F 11/1471 719/328 |
| 2007/0043870 A1* | 2/2007 | Ninose | ................ | G06F 11/2064 709/226 |

(Continued)

FOREIGN PATENT DOCUMENTS

| | | |
|---|---|---|
| JP | 2007-264946 A | 10/2007 |
| JP | 2008-065525 A | 3/2008 |
| JP | 2011-008391 A | 1/2011 |

OTHER PUBLICATIONS

PCT Written Opinion of the International Searching Authority on application PCT/JP2014/0262593 dated Jul. 22, 2014; 3 pages.

(Continued)

*Primary Examiner* — Jared Rutz
*Assistant Examiner* — Marwan Ayash
(74) *Attorney, Agent, or Firm* — Foley & Lardner LLP

(57) ABSTRACT

The primary storage sub system writes a marker that includes the sequence number and that indicates a completion of the data copy into the journal storage area of the first primary group when the data copy from a first primary data volume to a second primary data volume is completed. The primary storage sub system transmits a journal of the first primary group to a first secondary group corresponded to the first primary group and transmits a journal of a second primary group to a second secondary group corresponded to a second primary group. The secondary storage sub system reflects a journal of the first secondary group to a secondary data volume, terminates the reflection based on the marker, switches a volume that makes a volume pair with the secondary data volume from the first primary data volume to the second primary data volume, modifies a belonging of the secondary data volume from the first secondary group to the second secondary group, and reflects a journal in the journal (Continued)

storage area of the second secondary group to the secondary data volume.

9 Claims, 30 Drawing Sheets

(51) Int. Cl.
    *G06F 13/28*     (2006.01)
    *G06F 3/06*     (2006.01)

(56) References Cited

U.S. PATENT DOCUMENTS

| | | | | |
|---|---|---|---|---|
| 2007/0294274 | A1* | 12/2007 | Kano | G06F 17/30067 |
| 2008/0059732 | A1* | 3/2008 | Okada | G06F 11/1471 |
| | | | | 711/162 |
| 2008/0281879 | A1* | 11/2008 | Kawamura | G06F 11/1469 |
| 2009/0300304 | A1* | 12/2009 | Boyd | G06F 17/30575 |
| | | | | 711/162 |
| 2010/0332776 | A1* | 12/2010 | Uchikado | G06F 11/2064 |
| | | | | 711/162 |
| 2011/0154102 | A1 | 6/2011 | Akutsu et al. | |
| 2014/0379715 | A1* | 12/2014 | Kesselman | G06F 17/30598 |
| | | | | 707/737 |

OTHER PUBLICATIONS

PCT International Search Report on application PCT/JP2014/062593 mailed Jul. 22, 2014; 3 pages.

* cited by examiner

Fig. 6

VOL management table (430)

| Real VOL # | Storage device # | RAID level | Start LBA | End LBA |
|---|---|---|---|---|
| 1 | 0,1,2,3 | 2D+2P | 00001 | 01000 |
| 2 | 8,9,10,11 | 2D+2P | 01001 | 03000 |
| ... | ... | ... | ... | ... |
| 31 | 16,17,18,19, 20,21,22,23, | 6D+2P | 03001 | 04000 |
| 32 | 28,29,30,21, 32,33,34,35 | 6D+2P | 04001 | 05000 |
| 33 | 36,37,38,39, 40,41,42,43 | 6D+2P | 05001 | 06000 |
| 34 | Undefined | Undefined | Undefined | Undefined |
| ... | ... | ... | ... | ... |
| 38 | 12,13,14,15 | 3D+1P | 20001 | 21000 |
| 39 | 24,25,26,27 | 3D+1P | 21001 | 22000 |
| 40 | Undefined | Undefined | Undefined | Undefined |
| ... | ... | ... | ... | ... |

Columns: 611, 612, 613, 614, 615

| JNLG management table | | |
|---|---|---|
| 711 | 712 | 713 |
| JNLG attribute | Real JNLG # | JVOL# |
| M-JNLG | 3333 | 39 |
| ... | ... | ... |

431B

| JNLG management table | | |
|---|---|---|
| 711 | 712 | 713 |
| JNLG attribute | Real JNLG # | JVOL# |
| M-JNLG | 4444 | 49 |
| ... | ... | ... |

431C

| JNLG management table | | |
|---|---|---|
| 711 | 712 | 713 |
| JNLG attribute | Real JNLG # | JVOL# |
| R-JNLG | 5555 | 58 |
| | | 59 |
| R-JNLG | 6666 | 69 |
| ... | ... | ... |

Fig. 8

Real pair management table (432A)

| Real pair # | PVOL # | M-JNLG # | Pair apparatus # | SVOL # | R-JNLG # | Pair status | JNL creation flag | JNL restore flag |
|---|---|---|---|---|---|---|---|---|
| 310 | 31 | 3333 | 3 | 51 | 5555 | PAIR | ON | ON |
| 320 | 32 | 3333 | 3 | 52 | 5555 | PAIR | ON | ON |
| 330 | 33 | 3333 | 3 | 53 | 5555 | PAIR | ON | ON |
| ... | ... | ... | ... | ... | ... | ... | ... | ... |

Real pair management table (432B)

| Real pair # | PVOL # | M-JNLG # | Pair apparatus # | SVOL # | R-JNLG # | Pair status | JNL creation flag | JNL restore flag |
|---|---|---|---|---|---|---|---|---|
| 420 | 42 | 4444 | 3 | 61 | 6666 | PAIR | ON | ON |
| ... | ... | ... | ... | ... | ... | ... | ... | ... |

Real pair management table (432C)

| Real pair # | PVOL # | M-JNLG # | Pair apparatus # | SVOL # | R-JNLG # | Pair status | JNL creation flag | JNL restore flag |
|---|---|---|---|---|---|---|---|---|
| 310 | 31 | 3333 | 1 | 51 | 5555 | PAIR | ON | ON |
| 320 | 32 | 3333 | 1 | 52 | 5555 | PAIR | ON | ON |
| 330 | 33 | 3333 | 1 | 53 | 5555 | PAIR | ON | ON |
| 420 | 42 | 4444 | 2 | 61 | 6666 | PAIR | ON | ON |
| ... | ... | ... | ... | ... | ... | ... | ... | ... |

Fig. 9

| Virtual storage apparatus management table | |
|---|---|
| Virtual storage apparatus # | Storage apparatus # |
| 10 | 1 |
|  | 2 |
| 20 | 3 |
| ... | ... |

Fig. 10

Virtual volume management table — 434

| Virtual storage apparatus # (1011) | Virtual JNLG attribute (1012) | Virtual JNLG # (1013) | Virtual VOL # (1014) | Storage apparatus # (1015) | Real JNLG # (1016) | Real VOL # (1017) |
|---|---|---|---|---|---|---|
| 10 | M-JNLG | 1111 | 11 | 1 | 3333 | 31 |
|  |  |  | 12 | 1 | 3333 | 32 |
|  |  |  | 13 | 1 | 3333 | 33 |
|  |  |  | 14 | 2 | 4444 | 42 |
| ... | ... | ... | ... | ... | ... | ... |
| 20 | R-JNLG | 2222 | 21 | 3 | 5555 | 51 |
|  |  |  | 22 | 3 | 5555 | 52 |
|  |  |  | 23 | 3 | 5555 | 53 |
|  |  |  | 24 | 3 | 6666 | 61 |
| ... | ... | ... | ... | ... | ... | ... |

Fig. 11

| | | | 435 |
|---|---|---|---|
| Virtual journal group management table | | | |
| 1111 | 1112 | 1113 | 1114 |
| Virtual JNLG attribute | Virtual JNLG # | Real storage apparatus # | Real JNLG # |
| M-JNLG | 1111 | 1 | 3333 |
| | | 2 | 4444 |
| R-JNLG | 2222 | 3 | 5555 |
| | | 3 | 6666 |
| ... | ... | ... | ... |

| Sequence number management table  [M-JNLG(ID=3333)] | | | |
|---|---|---|---|
| 1311 | 1312 | 1313 | 1314 |
| Latest sequence number | Arrived sequence number | Restored sequence number | Transferable sequence number |
| 106 | 101 | 98 | 104 |

437B

| Sequence number management table  [M-JNLG(ID=4444)] | | | |
|---|---|---|---|
| 1311 | 1312 | 1313 | 1314 |
| Latest sequence number | Arrived sequence number | Restored sequence number | Transferable sequence number |
| 154 | 141 | 130 | 149 |

437C

| Sequence number management table  [R-JNLG(ID=5555)] | | | |
|---|---|---|---|
| 1311 | 1312 | 1313 | 1314 |
| Latest sequence number | Arrived sequence number | Restored sequence number | Transferable sequence number |
| — | 101 | 98 | — |

Fig. 15

Interval ID integrated management table — 313

| Virtual JNLG # (1451) | Latest interval ID (1452) | Restorable interval ID (1453) | Real JNLG # (1454) | Arrived interval ID (1455) |
|---|---|---|---|---|
| 1111 | 10 | 6 | 3333 | 7 |
|  |  |  | 4444 | 6 |
| ... | ... | ... | ... | ... |

Fig. 16

Journal management table [JNLG#XX] — 439

| Sequence number (1511) | Interval ID (1512) | Real pair # (1513) | Data storage area (1514) JVOL# | Data storage area (1515) Address | Transmission information (1516) | END marker (1516) | |
|---|---|---|---|---|---|---|---|
| 100 | 8 | 310 | 3 | 20001-20010 | Transmitted | OFF | |
| 101 | 8 | 320 | 3 | 20011-20020 | Transmitted | OFF | |
| 102 | 9 | 310 | 3 | 20021-20030 | Untransmitted | OFF | |
| 103 | 9 | 330 | 4 | 21001-21010 | Untransmitted | OFF | |
| 104 | 10 | 330 | 4 | 21011-21020 | Untransmitted | OFF | 1520 |
| 105 | 10 | 320 | 4 | 21021-21030 | Untransmitted | OFF | 1521 |
| 106 | 10 | 330 | - | - | Untransmitted | ON | 1522 |
| ... | ... | ... | ... | ... | ... | ... | |

Fig. 17

| Movement management table 440 | | | |
|---|---|---|---|
| Movement source (1611, 1613) | | Movement source (1615, 1617) | |
| Storage apparatus # | Real VOL # | Storage apparatus # | Real VOL # |
| 1 | 33 | 2 | 41 |
| ... | ... | ... | ... |

STORAGE SYSTEM WITH PRIMARY AND SECONDARY DATA STORAGE GROUPS AND CONTROL METHOD THEREOF

TECHNICAL FIELD

The present invention relates to a storage system and a control method thereof.

BACKGROUND ART

In recent years, countermeasures to large-scale disasters of a data center have been required for corporate enterprises. As a countermeasure to large-scale disasters, a remote copy is carried out in which data in a data center is copied to a remote location. For the remote copy, a storage apparatus of a primary data center (hereafter referred to as a primary storage apparatus) receives a write request of data from a host computer, stores the data, and transmits the data to a storage apparatus of a secondary data center of a remote location (hereafter referred to as a secondary storage apparatus).

There are a synchronous type and an asynchronous type for the remote copy. In the case in which data is copied to a secondary storage apparatus of a remote location, an asynchronous remote copy is used generically. For a synchronous remote copy, after a primary storage apparatus that has received a write request from a host computer transmits write data to a secondary storage apparatus, the primary storage apparatus executes a write response to the host computer. Consequently, it takes a long response time to the host computer depending on a distance between the primary storage apparatus and the secondary storage apparatus, therefore deteriorating a response performance.

For an asynchronous remote copy, to a write request from a host computer, the primary storage apparatus stores write data into a data volume (data VOL), stores a journal into a journal volume (JVOL), and transmits a write response to the host computer. After that, the primary storage apparatus transmits a journal to the secondary storage apparatus at a predetermined moment. At this time, in order to maintain the consistency of write data, it is necessary to ensure that a sequence of write data that is written to a data VOL of the secondary storage apparatus based on a journal is equivalent to a sequence of a reception of a write request from the host computer to the primary storage apparatus. Therefore, a sequence number that indicates a sequence of a write request from the host computer is imparted to a journal.

For the asynchronous remote copy, since a load to store a journal is concentrated on the JVOL, a response performance from the host computer to an I/O (Input or Output) is deteriorated unfortunately. Consequently, in an environment containing a plurality of primary storage apparatuses in a primary data center, it is required that a load to treat a journal of the asynchronous remote copy is dispersed to other storage apparatuses in the same data center to be leveled.

In the case in which writing occurs to a plurality of data VOLs in the primary storage apparatus, a journal in which a series of sequence numbers are imparted to the write data that is stored into a plurality of data VOLs is stored into the JVOL. A group for ensuring a write sequence of the write data among a plurality of data VOLs is referred to as a journal group (JNLG). A plurality of data VOLs and the JVOL for storing a journal in which a series of sequence numbers are imparted to the write data that is written to the plurality of data VOLs belong to the JNLG.

As the conventional technology, PTL 1 discloses an asynchronous remote copy system in which all volumes that belong to the JNLG are switched at once and a remote copy is restarted with a subsequent sequence number between a second primary storage apparatus and a secondary storage apparatus during a failure of a first primary storage apparatus by synchronizing sequence numbers of journals in the JNLG of each storage apparatus between a first primary storage apparatus and a second primary storage apparatus for instance.

CITATION LIST

Patent Literature

[PTL 1]
US Patent Application Laid-Open Publication No. 2011/0154102

SUMMARY OF INVENTION

Technical Problem

For the asynchronous remote copy system of the above described conventional technology, in the case in which data of the first primary storage apparatus is moved to the second primary storage apparatus, since it is necessary that data is moved in a JNLG unit as described above, the system is not suitable for dispersing and leveling a load to treat a journal.

An object of the present invention is to disperse and level a load to treat a journal for a storage system.

Solution to Problem

The present invention was made in order to solve the above problems. A storage system in accordance with a mode of the present invention comprises a primary storage sub system being coupled to a host computer and a secondary storage sub system being coupled to the primary storage sub system. The primary storage sub system is provided with a plurality of primary data volumes and the secondary storage sub system is provided with a plurality of secondary data volumes which respectively form a volume pair with the plurality of primary data volumes. The primary storage sub system is configured to create a primary group including a plurality of data volumes which store write data transmitted from the host computer and a journal storage area which stores a journal including a sequence number for ensuring a write sequence of the write data. The secondary storage sub system is configured to create a secondary group corresponded to the primary group. The secondary group is configured to include a secondary journal storage area which stores a journal from the primary storage system and a plurality of secondary data volumes which is updated based on a journal in the secondary journal storage area. The secondary storage sub system being configured to create a correspondence of a first primary data volume included in a first primary group and a secondary data volume included in a first secondary group as a volume pair for an asynchronous copy. The primary storage sub system being configured to execute a data copy from the first primary data volume to a second primary data volume which belongs to a second primary group, write a marker which includes the sequence number and indicates a completion of the data copy into the journal storage area of the first primary group when the data copy is completed, transmit a journal of the first primary group to a journal storage area which belongs to the first secondary group corresponded to the first primary group, and transmit a journal of the second primary group to a journal storage area configured to belong to the second secondary group corresponded to the second primary group. The secondary storage sub system is configured to reflect a journal of the first secondary group to the secondary data volume, terminate the reflection based on the marker, switch a volume which makes a volume pair with the secondary data volume from the first primary data volume to the second primary data volume, modify a belonging of the secondary data volume from the first secondary group to the second secondary group, and reflect a journal in the journal storage area of the second secondary group to the secondary data volume.

Advantageous Effects of Invention

In accordance with a mode of the present invention, a load to treat a journal can be dispersed and leveled.

BRIEF DESCRIPTION OF DRAWINGS

FIG. 6 is a view showing an example of a VOL management table 430.
FIG. 7 is a view showing an example of a JNLG management table 431.
FIG. 8 is a view showing an example of a real pair management table 432.
FIG. 9 is a view showing an example of a virtual storage apparatus management table 433.
FIG. 10 is a view showing an example of a virtual VOL management table 434.
FIG. 11 is a view showing an example of a virtual JNLG management table 435.
FIG. 13 is a view showing an example of a sequence number management table 437.
FIG. 15 is a view showing an example of an interval ID integrated management table 313.
FIG. 16 is a view showing an example of a journal management table 439.
FIG. 17 is a view showing an example of a movement management table 440.

DESCRIPTION OF EMBODIMENTS

An embodiment of the present invention will be described below in detail with reference to the figures. In the figures, equivalent elements illustrated in figures are numerically numbered similarly. However, the present invention is not restricted to the embodiment, and a wide variety of applications that meet the concept of the present invention is included in the technical scope of the present invention. Moreover, the number of each of compositional elements can be a plural number or a single number unless otherwise limited.

In the following descriptions, while a variety of information will be described in the expression of "xxx table" in some cases, the information can be represented by a data structure other than a table. In order to indicate that the information is not depended on a data structure, the expression of "xxx table" can also be referred to as "xxx information".

In the following descriptions, the processing will be described while a "program" is handled as a subject in some cases. In the case in which the program is executed by a processor (a CPU (Central Processing Unit) for instance), since the processor executes the predetermined processing by using a storage resource (such as a memory) and a communication interface apparatus (such as a communication port) as it decides proper, a subject of a processing can also be a processor. Moreover, the processor can also include dedicated hardware in addition to the CPU. A computer program can be installed from a program source to each of the computers. The program source can also be a program distribution server or a storage medium for instance.

While each element can be identified by the identification information such as an ID, a number, and an identifier, the information of other kind such as a name can also be used, provided that the information can be identified. In the following descriptions, as substitute for a reference symbol of a drawing, the identification information such as an ID, an identifier, and a number is used as the information for identifying an object in some cases.

Embodiment 1

Figure 1:
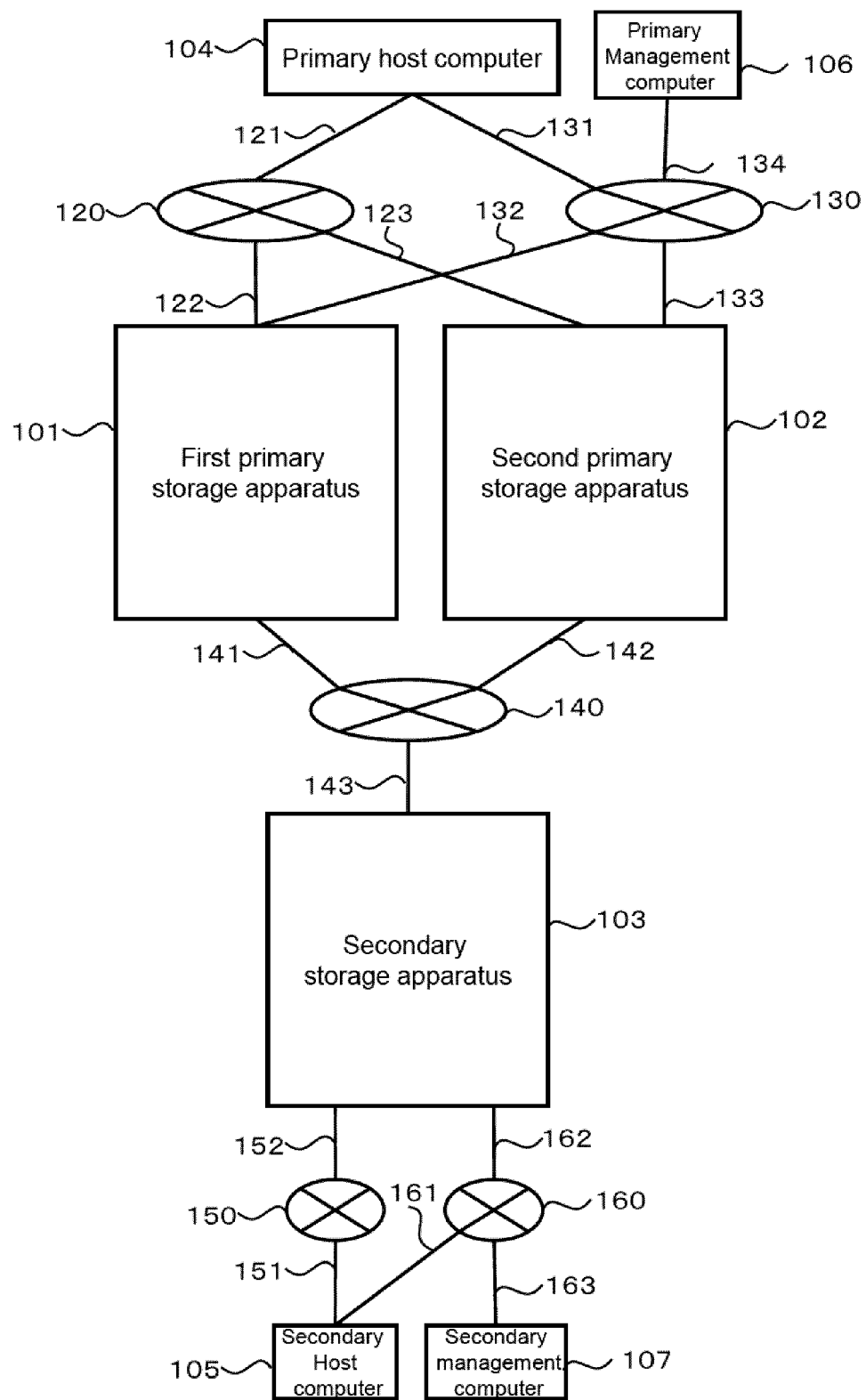
FIG. 1 is a block diagram showing a computer system in accordance with an embodiment 1.

An embodiment 1 will be described with reference to FIGS. 1 to 25 in the following.
FIG. 1 is a block diagram showing a computer system in accordance with an embodiment 1.
A computer system is provided with a storage system, one or a plurality of primary host computers 104, and one or a plurality of secondary host computers 105. The storage system is provided with a primary storage system, a secondary storage system, one or a plurality of primary management computers 106, and one or a plurality of secondary management computers 107. The primary storage system is coupled to the secondary storage system via a network 140. The secondary storage system can also be placed separately from the primary storage system.

The primary storage system is provided with one or a plurality of first primary storage apparatuses 101 and one or a plurality of second primary storage apparatuses 102. Moreover, the primary storage system is coupled to one or a plurality of primary management computers 106 and one or a plurality of primary host computers 104.

The secondary storage system is provided with one or a plurality of first secondary storage apparatuses 103. Moreover, the secondary storage system is coupled to one or a plurality of secondary management computers 107 and one or a plurality of secondary host computers 105.

The primary host computers 104, the first primary storage apparatus 101, and the second primary storage apparatus 102 are coupled to each other via a SAN (Storage Area Network) 120 for instance. The primary host computers 104 is coupled to the SAN 120 via a communication line 121, the first primary storage apparatus 101 is coupled to the SAN 120 via a communication line 122, and the second primary storage apparatus 102 is coupled to the SAN 120 via a communication line 123.

Moreover, the primary host computers 104, the first primary storage apparatus 101, the second primary storage apparatus 102, and the primary management computer 106 are coupled to each other via a management network 130 for instance. The primary host computers 104 is coupled to the management network 130 via a communication line 131, the first primary storage apparatus 101 is coupled to the management network 130 via a communication line 132, the second primary storage apparatus 102 is coupled to the management network 130 via a communication line 133, and the primary management computer 106 is coupled to the management network 130 via a communication line 134.

The first primary storage apparatus 101, the second primary storage apparatus 102, and the secondary storage apparatus 103 are coupled to each other via a network (such as a WAN (Wide Area Network)) 140 for instance. The first primary storage apparatus 101 is coupled to the WAN 140 via a communication line 141, the second primary storage apparatus 102 is coupled to the WAN 140 via a communication line 142, and the secondary storage apparatus 103 is coupled to the WAN 140 via a communication line 143.

The secondary host computer 105 and the secondary storage apparatus 103 are coupled to each other via a SAN 150 for instance. The secondary host computer 105 is coupled to the SAN 15 via a communication line 151 and the secondary storage apparatus 103 is coupled to the SAN 15 via a communication line 152.

Moreover, the secondary host computer 105, the secondary storage apparatus 103, and the secondary management computer 107 are coupled to each other via a management network 160 for instance. The secondary host computer 105 is coupled to the management network 160 via a communication line 161, the secondary storage apparatus 103 is coupled to the management network 160 via a communication line 162, and the secondary management computer 107 is coupled to the management network 160 via a communication line 163.

The communication lines 121 to 123, 131 to 134, 141 to 143, 151 to 152, and 161 to 163 described above can be fixed wires such as a metal cable and an optical fiber cable or wireless for instance. In the case of a wireless configuration, the communication lines are omitted. Moreover, the number of the communication lines is not restricted to one, and a plurality of communication lines can also be used.

Moreover, the SANs 120 and 150, the management networks 130 and 160, and the WAN 140 can also be common networks. These are communication networks and are a SAN, a LAN (Local Area Network), or a WAN for instance.

Figure 2:
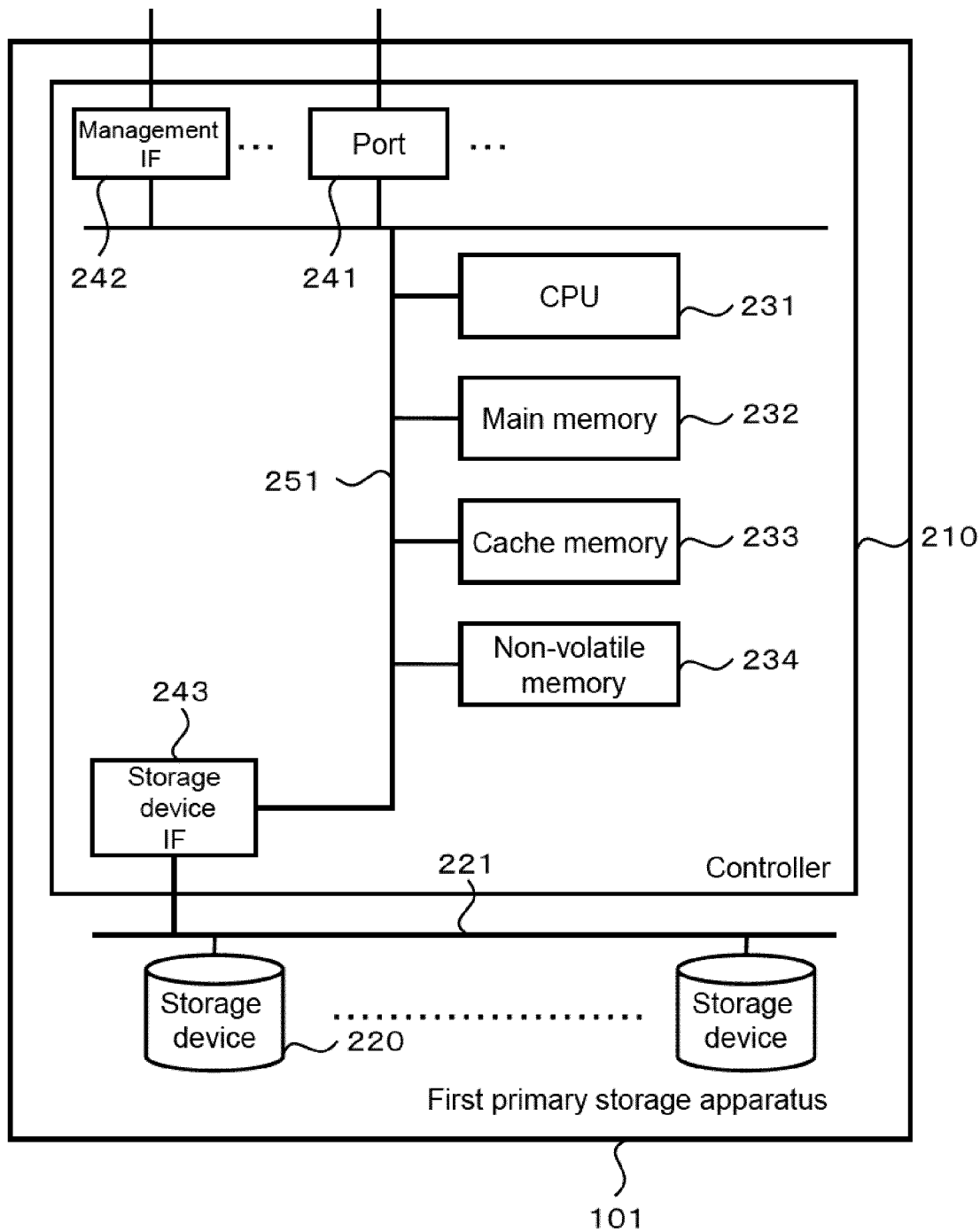
FIG. 2 is a block diagram showing a storage apparatus.

FIG. 2 is a block diagram showing a storage apparatus. In the following descriptions, a configuration of the first primary storage apparatus 101 will be described as an example of a configuration of a storage apparatus. The second primary storage apparatus 102 and the secondary storage apparatus 103 can also be configured similarly.

In the following descriptions moreover, the primary host computer 104 and the primary management computer 106 that are coupled to the first primary storage apparatus 101 will be described. In the case of the secondary storage apparatus 103, the secondary host computer 105 and the secondary management computer 107 can be substituted for the above.

The first primary storage apparatus 101 is provided with one or a plurality of controllers 210 and one or a plurality of storage devices 220. The controller 210 and the storage device 220 are coupled to each other by a communication line 221. The communication line 221 is wired-coupled by a cable such as a SAS (Serial Attached SCSI) cable, a SATA (Serial Advanced Technology Attachment) cable, and an FC (Fiber Channel) cable. However, the communication line 221 can also be wired-coupled by other cables or wireless-coupled.

The plurality of storage devices 220 are an SSD (Solid State Drive), a SAS-HDD (Hard Disk Drive), or a SATA for instance. As substitute for at least one of the storage devices or in addition to the storage devices, a physical storage device of other type can also be used.

The controller 210 controls the write or read of data to the storage device 220 in accordance with a command that has been received from the primary host computer 104.

The controller 210 is provided with a storage resource, a communication interface apparatus (hereafter a communication interface apparatus is referred to as IF), and a CPU (Central Processing Unit) 231.

The storage resource is a main memory 232, a cache memory 233, or a non-volatile memory 234 for instance. The non-volatile memory 234 is a rewritable non-volatile memory such as a flash memory for instance.

As the communication IFs, a port 241, a management IF 242, and a storage device IF 243 can be mentioned for instance.

The CPU 231, the storage resources 232, 233, 234, and the communication IFs 241, 242, 243, 244 are coupled to each other via a communication line such as a bus.

Programs 410 to 418 (described later) that have been stored in the non-volatile memory 234 are read into main memory 232 as necessary. In the case in which the CPU 231 executes the programs 410 to 418 read into main memory 232, a variety of processing described later is executed.

The cache memory 233 temporarily stores data that has been received from the primary host computers 104 and data that has been read from the storage device 220.

The port 241 is coupled to the primary host computers 104 and other storage apparatuses 102 and 103 via a communication line (such as a SAN and a WAN), and receives an access command (a command such as a write command and a read command) from the primary host computers 104 and other storage apparatuses 102 and 103.

The management IF 242 is coupled to the primary management computer 106 via a communication line or a management network. The management IF 242 is a NIC (Network Interface Card) for instance.

The storage device IF 243 is coupled to the storage device 220 via a communication line 221, and transmits/receives data to/from the storage device 220.

The basic operation of the first primary storage apparatus 201 will be briefly described in the following.

In the case in which a write command is received from the primary host computer 104, the controller 210 stores the write data that has been received from the primary host computer 104 into the cache memory 233, and writes the write data that has been stored in the cache memory 233 to the storage device 220 via the storage device IF 243. The controller 210 then transmits a notice of a completion of a write command processing to the primary host computer 104. The notice of a completion of a write command processing can also be transmitted to the primary host computer 104 at a time point when the write data is stored into the cache memory 233 or when the write data is written to the storage device 220.

In the case in which a read command is received from the primary host computer 104, the controller 210 checks whether or not the data that complies with the read command (read target data) has been stored in the cache memory 233. In the case in which the read target data has been stored in the cache memory 233, the controller 210 reads the read target data from the cache memory 233 and transmits the read target data to the primary host computer 104 via the port 241. In the case in which the read target data has not been stored in the cache memory 233, the controller 210 reads the read target data from at least one storage device 220 via the storage device IF 243 and stores the read target data into the cache memory 233. The controller 210 then transmits the read target data that has been stored in the cache memory 233 to the primary host computer 104 via the port 241.

The controller 210 can logically divide one or a plurality of storage devices 220 into a plurality of data storage areas to be used. In the following descriptions, data storage areas that have been logically divided are referred to as a volume (VOL) in some cases. In the case in which a plurality of storage devices 220 are formed, a storage device that is provided with redundancy by an appropriate RAID level (such as RAID5) can be configured by applying a RAID (Redundant Array of Independent Disks) configuration for instance.

Figure 3:
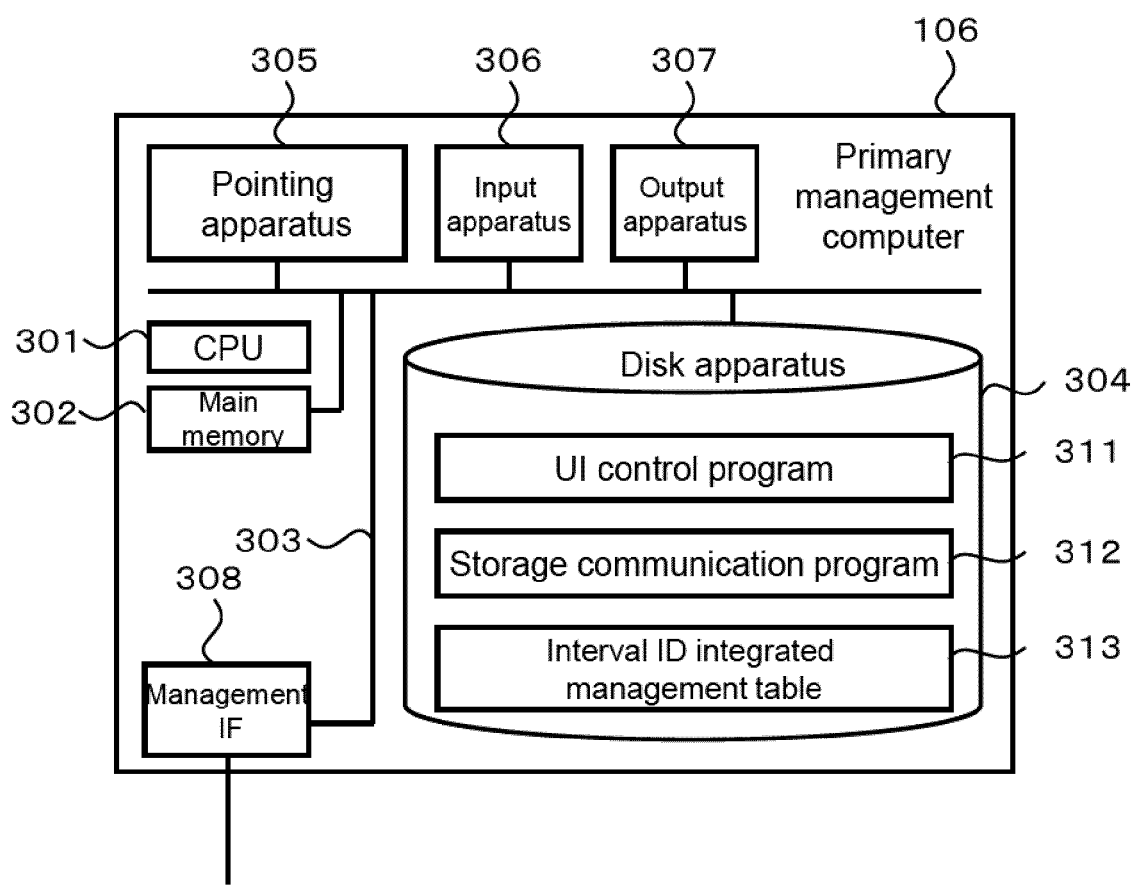
FIG. 3 is a block diagram showing a management computer.

FIG. 3 is a block diagram showing a management computer. In the following descriptions, a configuration of the primary management computer 106 will be described as an example of a configuration of a management computer. The secondary management computer 107 can also be configured similarly.

The primary management computer 106 is provided with a CPU 301, a main memory 302, a bus 303, a disk apparatus 304, a pointing apparatus 305, an input apparatus 306, an output apparatus 307, and a management IF 308.

The CPU 301, the main memory 302, the disk apparatus 304, the pointing apparatus 305, the input apparatus 306, the output apparatus 307, and the management IF 308 are coupled to each other via the bus 303.

A UI control program 311, a storage communication program 312, and an interval ID integrated management table 313 are stored in the disk apparatus 304. Those programs 311 to 313 are transmitted to the main memory 302 and executed by the CPU 310.

In the case in which the UI control program 311 is executed by the CPU 301, a UI control processing is executed. In the case in which the storage communication program 312 is executed by the CPU 301, a storage communication processing is executed. The UI control processing is a processing for storing the information input from a manager via the pointing apparatus 305 or the input apparatus 306 into the main memory 302. The storage communication processing is a processing for communicating with the storage apparatus 201 via a management network. By the processing, the information input from a manager is transmitted to the storage apparatus 201 as necessary.

The interval ID integrated management table 313 is a table for managing the latest interval ID and for integrating and managing the information that is stored by an interval ID management table 438 (described later) that is held in the main memory 232 of the storage apparatus.

Figure 4:
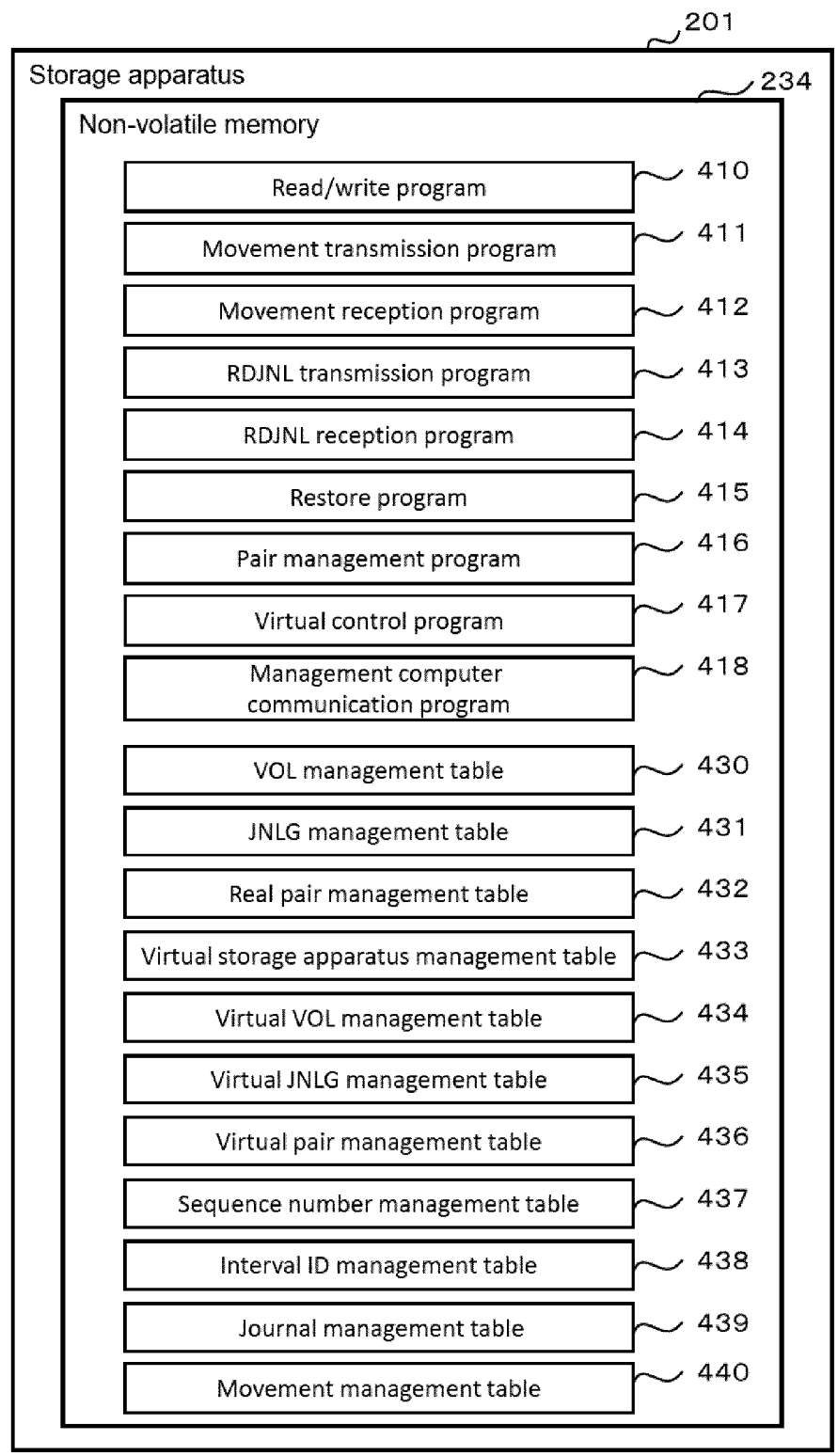
FIG. 4 is a view showing a non-volatile memory 234 of a storage apparatus.

FIG. 4 is a view showing a non-volatile memory 234 of a storage apparatus.

The non-volatile memory 234 of a storage apparatus stores a computer program and a table. More specifically for instance, the non-volatile memory 234 stores a read/write program 410, a movement transmission program 411, a movement reception program 412, an RDJNL (read journal) transmission program 413, an RDJNL (read journal) reception program 414, a restore program 415, a pair management program 416, a virtual control program 417, a management computer communication program 418, a VOL management table 430, JNLG management table 431, a real pair management table 432, a virtual storage apparatus management table 433, a virtual VOL management table 434, a virtual JNLG management table 435, a virtual pair management table 436, a sequence number management table 437, an interval ID management table 438, a journal management table 439, and a movement management table 440.

The management computer communication program 418 is a program for communicating with the primary management computer 106 for instance.

The read/write program 410 is a program for executing a processing related to a read/write of data from the primary host computer 104 for instance.

The movement transmission program 411 is a program for transmitting data of a movement source real VOL of an own storage apparatus to a movement destination real VOL of a storage apparatus of a movement destination for instance.

The movement reception program 412 is a program for receiving data that is transmitted from a movement source real VOL of a storage apparatus of a movement source to a movement destination real VOL of an own storage apparatus for instance.

The RDJNL transmission program 413 a program for issuing a read request of a journal (hereafter referred to as a read journal request) to the primary storage apparatuses 101 and 102 for instance. This program can also be held in only the secondary storage apparatus 103.

The RDJNL reception program 414 a program for receiving a read journal request from the secondary storage apparatus 103 and for transmitting a journal and the control information of a journal to the secondary storage apparatus 103 as its response for instance. This program can also be held in only the primary storage apparatuses 101 and 102.

The restore program 415 is a program for storing data in a real VOL of an own storage apparatus that is a remote copy pair (a secondary VOL: SVOL) based on the control information of a journal that has been received from the primary storage apparatuses 101 and 102 for instance. This program can also be held in only the secondary storage apparatus 103.

The pair management program 416 is a program for managing the configuration information of a remote copy pair and for updating the real pair management table 432 for instance.

The virtual control program 417 is a program for managing the relationship between a virtual ID and a real ID of a storage apparatus, a real VOL, a JNLG, a remote copy pair, and so on and for updating the contents of the virtual storage apparatus management table 433, the virtual VOL management table 434, the virtual JNLG management table 435, and the remote copy management table 436 in the case in which a real ID is modified for instance.

The management computer communication program 418 is a program for communicating with the primary management computer 106, for receiving a pair forming instruction and an interval ID, and for updating the interval ID management table 438 for instance.

It is not necessary that the computer programs and tables described above and shown in the figure are essential elements for each of the storage apparatuses 101, 102, and 103. The details of each table will be described later.

Figure 5:
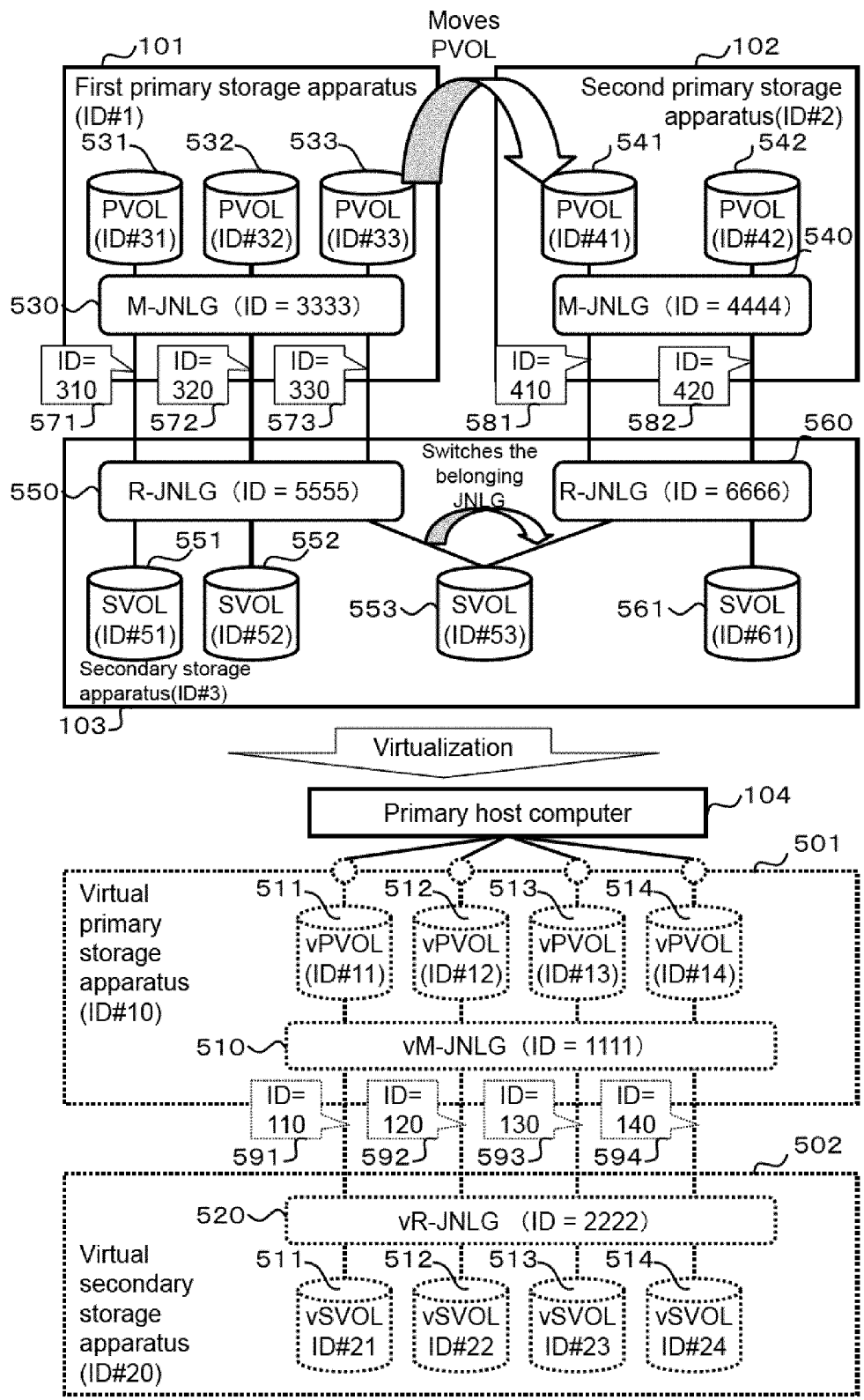
FIG. 5 is a view illustrating an outline of an operation of an embodiment 1.

FIG. 5 is a view illustrating an outline of an operation of an embodiment 1.

One or a plurality of storage devices 220 in the storage apparatus configures a real VOL that is a storage area divided logically. For the real VOLs, a real VOL that stores data itself that is read or written by the host computer is a data VOL (Data Volume), and a real VOL that stores a journal that is output in the case in which a read/write to the data VOL is executed is a JVOL (Journal Volume). A correspondence relationship between the storage device 220 and the real VOL is managed by the VOL management table 430. The storage location of a journal is not restricted to the real VOL and can also be other storage areas such as a cache memory.

For the data VOLs, a real VOL of the primary storage apparatuses 101 and 102 is a PVOL (Primary Volume) and a real VOL of the secondary storage apparatus 103 is an SVOL (Secondary Volume).

A plurality of real VOLs and JVOLs are managed in a JNLG (Journal Group) unit. A JNLG of the primary storage apparatus 101 is an M-JNLG (Main JNLG) 530, and a JNLG of the primary storage apparatus 102 is an M-JNLG 540. For instance, the PVOLs 531, 532, and 533 (ID=31, 32, and 33) belong to the M-JNLG 530 (ID=3333). Other M-JNLG and R-JNLG are similarly configured.

In order to ensure a write sequence to a plurality of PVOLs that belong to the JNLG, a journal to which the control information including a sequence number has been imparted is created to the write data and stored into a JVOL of the JNLG.

The JNLG of the primary storage apparatuses 101 and 102 and the JNLG of the secondary storage apparatus 103 are corresponded to each other one-on-one. For instance, for JNLGs of the secondary storage apparatus 103, a JNLG corresponded to the M-JNLG 540 is an R-JNLG (Remote JNLG) 550, and a JNLG corresponded to the M-JNLG 540 is an R-JNLG 560.

A plurality of PVOLs and SVOLs of two JNLGs corresponded to each other form a volume pair respectively. For instance, the PVOLs 531, 532, 533, and 542 and the SVOLs 551, 552, 553, and 561 are managed on the real pair management table 432 by the pair management table 416 described later as pairs 571, 572, 573, and 582 (pair ID=310, 320, and 420). Data of the PVOLs 531, 532, 533, and 542 is remote-copied to the SVOLs 551, 552, 553, and 561 respectively by the read/write program 410, the RDJNL transmission program 413, the RDJNL reception program 414, and the restore program 415A.

In the case in which a PVOL (ID=33) 533 of the first primary storage apparatus 101 is moved to the second primary storage apparatus 102 by the movement transmission program 411 and the movement reception program 412 described later, a PVOL (ID=41) 541 is newly created to the second primary storage apparatus 102 in advance and the data movement is executed. After the data movement, journal data with an END marker is stored into a JVOL of the M-JNLG 530 and a remote copy pair of a PVOL (ID=41) and an SVOL (ID=53) is formed.

At this time, a journal of a JVOL of an M-JNLG (ID=41) 541 to which a PVOL (ID=33) 533 that is a movement source VOL of data belong and a journal of a JVOL of an M-JNLG (ID=41) 541 to which a PVOL (ID=41) 541 that is a movement destination of data belong are transmitted to an R-JNLG (ID=5555) and an R-JNLG (ID=6666) corresponded to an SVOL (ID=53) of a remote copy destination, respectively. Moreover, a restore of a journal to the SVOL (ID=53) is switched from a JVOL that belongs to an R-JNLG (ID=5555) to a JVOL that belongs to an R-JNLG (ID=6666) based on an END marker.

Even in the case in which data in a part of a plurality of PVOLs that belong to a JNLG in the primary storage system is copied to a PVOL that belongs to other JNLG, the consistency of data in the SVOL can be maintained by imparting an END marker to a remote copy pair to a journal.

The virtual control program 417 described later executes the virtualization of a storage apparatus in order to hide the above modification to the primary host computer 104. More specifically, the first primary storage apparatus 101 that is a movement source and the second primary storage apparatus 102 that is a movement destination are made to be recognized from the primary host computer 104 as a virtual primary storage apparatus 501 that is a virtual storage apparatus.

For instance, a PVOL (ID=33) is managed as a vPVOL (ID=13) for the virtual primary storage apparatus 501, and a remote copy pair (ID=330) of a PVOL (ID=33) and an SVOL (ID=53) is managed as a remote copy pair (ID=130) of a vPVOL (ID=13) and a vSVOL (ID=23) for the virtual primary storage apparatus 501. In the case in which data in a PVOL (ID=33) is moved to a PVOL (ID=41), a correspondence of a real VOL and a virtual VOL is modified in such a manner that a PVOL (ID=41) is a vPVOL (ID=13) of the virtual primary storage apparatus 501. Moreover, a pair of a PVOL (ID=41) and an SVOL (ID=53) is modified to be a remote copy pair (ID=130) of the virtual primary storage apparatus 501. By this configuration, it is not necessary that the primary host computer 104 is conscious of the modification. The primary storage apparatus 101 or the primary storage apparatus 102 can notify the primary host computer 104 or devices (such as a switch) between the primary host computer 104 and the primary storage apparatuses 101 and 102 of the modification that has occurred. By this, the primary storage apparatuses 101 and 102 of an I/O destination from the primary host computer 104 can be modified.

The modification of a correspondence relationship between real and virtual for a storage apparatus, a VOL, a JNLG, and a remote copy pair is managed by the virtual control program 417, the virtual storage apparatus management table 433, the virtual JNLG management table 435, the virtual VOL management table 434, and the virtual pair management table 436 described later.

The controller 210 can also manage the correspondence between a storage device and a real VOL and the correspondence between a real VOL and a virtual VOL by a plurality of hierarchies. For instance, a management method can also be adopted, in which one or a plurality of physical VOLs are divided into one or a plurality of storage area management units (pages), a pool is configured by one or a plurality of pages, and the correspondence between a virtual VOL and a page is executed by Thin Provisioning.

FIG. 6 is a view showing an example of a VOL management table 430.

Each of the primary storage apparatuses 101 and 102 and the secondary storage apparatus 103 is provided with the VOL management table 430. The configurations of the tables can be the same. The table 430 is a table for managing the configuration information of a real VOL of the own storage apparatus. The table 430 is provided with an entry of every real VOL. Each entry manages a real VOL number (#) 611, a storage device number (#) 612, a RAID level 613, a start LBA (Logical Block Address) 614, and an end LBA 615 by a correspondence.

The real VOL number 611 is an identification number of a real VOL that is defined for a storage apparatus.

The storage device number 612 is an identification number of the storage device 220 that is a basis of the real VOL. In the case in which there in not a storage device 220 that is a basis of the real VOL, the storage device number 612 can be "undefined".

The RAID level 613 is a RAID level that is configured by the real VOL. In the case in which there in not a storage device that is a basis of the real VOL, the RAID level 613 can be "undefined".

The start LBA 614 is a start physical address number of the storage device 220 that is a basis of the real VOL. In the case in which there in not a storage device that is a basis of the real VOL, the start LBA 614 can be "undefined".

The end LBA 615 is an end physical address number t of the storage device 220 that is a basis of the real VOL. In the case in which there in not a storage device that is a basis of the real VOL, the end LBA 615 can be "undefined".

In the figure, a real VOL #31 is based on an area of a RAID group of 6D+2P in which storage device #16, 17, 18, 19, 20, 21, 22, and 23 are used and indicates that a physical address of the area is in the range of "03001" to "04000" for instance.

FIG. 7 is a view showing an example of a JNLG management table 431.

Each of the first primary storage apparatus 101, the second primary storage apparatus 102, and the secondary storage apparatus 103 is provided with the JNLG management table 431. The configurations of the tables can be the same. The table 431 manages an attribute and so on of a JNLG in the own storage apparatus. In the present figure, a table that is included in the first primary storage apparatus 101 is identified as a JNLG management table 431A, a table that is included in the second primary storage apparatus 102 is identified as a JNLG management table 431B, and a table that is included in the secondary storage apparatus 103 is identified as a JNLG management table 431C. The numerical values in the table are corresponded to FIG. 5.

The table 431 is provided with an entry of every JNLG. Each entry is provided with a JNLG attribute 711, a real JNLG number (#) 712, and a JVOL number (#) 713.

The JNLG attribute 711 is the attribute information of the JNLG. In the present embodiment, a JNLG attribute on the primary storage system side is M-JNLG and a JNLG attribute on the secondary storage system side is R-JNLG.

The real JNLG number 712 is an identification number for uniquely identifying the JNLG.

The JVOL number 713 is a real VOL number of a JVOL that belongs to the JNLG.

The figure indicates that a real JNLG #3333 of M-JNLG is configured by a JVOL of a JVOL #39 for the first primary storage apparatus 101 for instance.

FIG. 8 is a view showing an example of a real pair management table 432.

Each of the first primary storage apparatus 101, the second primary storage apparatus 102, and the secondary storage apparatus 103 is provided with the real pair management table 432. The configurations of the tables can be the same. The table 432 manages a remote copy pair of a real VOL in the own storage apparatus. In the present figure, a table that is included in the first primary storage apparatus 101 is identified as a real pair management table 432A, a table that is included in the second primary storage apparatus 102 is identified as a real pair management table 432B, and a table that is included in the secondary storage apparatus 103 is identified as a real pair management table 432C. The numerical values in the table are corresponded to FIG. 5.

The table 432 is provided with an entry of every remote copy pair. Each entry is provided with a real pair number (#) 811, a PVOL number (#) 812, an M-JNLG number (#) 813, a pair apparatus number (#) 814, an SVOL number (#) 815, an R-JNLG number (#) 816, a pair status 817, and a JNL creation flag 818, and a JNL restore flag 819.

The real pair number 811 is an identifier of a remote copy pair that is configured by a PVOL and an SVOL.

The PVOL number 812 is an identifier of a PVOL of the remote copy pair.

The M-JNLG number 813 is an identifier of an M-JNLG to which a PVOL of the remote copy pair belongs.

The pair apparatus number 814 is an identifier of a storage apparatus that is provided with a real VOL of the other party of the remote copy pair.

The SVOL number 815 is an identifier of an SVOL of the remote copy pair.

The R-JNLG number 816 is an identifier of an R-JNLG to which an SVOL of the remote copy pair belongs.

The pair status 817 is a pair status of the remote copy pair. In the present embodiment, a status in which a pair of the remote copy pair is configured is "PAIR" and a status in which a pair of the remote copy pair is released is "SMPL" for instance.

The JNL creation flag 818 is a flag for indicating whether or not a journal can be created when write data is written to a PVOL of the remote copy pair. In the case in which a journal can be created, "ON" is set. In other cases, "OFF" is set. In the present embodiment, in the case in which the flag 818 is "OFF", an END marker described later is imparted to a journal. However, this configuration is not restricted.

The JNL restore flag 819 is a flag for indicating whether or not a restore from an R-JNLG to an SVOL of the remote copy pair is possible. In the case in which a restore to the SVOL is possible, "ON" is set. In the case in which a restore is suspended, "OFF" is set.

In the figure for instance, the remote copy pair of a real pair #320 is a PVOL #32 of the first primary storage apparatus 101 and an SVOL #52 of the secondary storage apparatus 103 that is a storage apparatus (pair apparatus) #3. For the remote copy pair of a real pair #320, the pair status 814 is "PAIR", a journal can be created for a PVOL #32, and a restore is possible for an SVOL #52.

FIG. 9 is a view showing an example of a virtual storage apparatus management table 433.

Each of the first primary storage apparatus 101, the second primary storage apparatus 102, and the secondary storage apparatus 103 is provided with the virtual storage apparatus management table 433. The configurations of the tables can be the same. The table 433 manages a correspondence of the own storage apparatus and a virtual storage apparatus.

The table 433 is provided with an entry of every virtual storage apparatus. Each entry is provided with a virtual storage apparatus number (#) 911 and a real storage apparatus number (#) 912.

The virtual storage apparatus number 911 is an identifier of a virtual storage apparatus that is recognized by the host computer.

The storage apparatus number 912 is an identifier of a storage apparatus that is a basis of the virtual storage apparatus.

In the figure, storage apparatuses #1 and #2 are corresponded to a virtual storage apparatus #10.

FIG. 10 is a view showing an example of a virtual VOL management table 434.

Each of the first primary storage apparatus 101, the second primary storage apparatus 102, and the secondary storage apparatus 103 is provided with the virtual VOL management table 433. The configurations of the tables can be the same. The table 434 makes a real VOL of the own storage apparatus correspond to a virtual VOL.

The table 434 is provided with an entry of every virtual storage apparatus. Each entry is provided with a virtual storage apparatus number (#) 1011, a virtual JNLG attribute 1012, a virtual JNLG number (#) 1013, a virtual VOL number (#) 1014, a storage apparatus number (#) 1015, a real JNLG number (#) 1016, and a real VOL number (#) 1017.

The virtual storage apparatus number 1011 is an identifier of a virtual storage apparatus that is recognized by the host computer.

The virtual JNLG attribute 1012 is the attribute information of a virtual JNLG that is included in a virtual storage apparatus. The virtual storage apparatus is provided with a virtual JNLG that is a virtual JNLG for collectively managing corresponding JNLGs. In the following descriptions, a JNLG is referred to as a real JNLG in some cases to distinguish from a virtual JNLG. For a virtual JNLG that is included in a virtual storage apparatus based on the primary storage apparatus, the virtual JNLG attribute 1012 is M-JNLG. For a virtual JNLG that is included in a virtual storage apparatus based on the secondary storage apparatus, the virtual JNLG attribute 1012 is R-JNLG.

The virtual JNLG number 1013 is an identifier of a virtual JNLG that is included in the virtual storage apparatus.

The virtual VOL number 1014 is an identifier of a virtual VOL that belongs to the virtual JNLG.

The storage apparatus number 1015 is an identifier of a storage apparatus that is provided with a real VOL corresponded to the virtual VOL.

The real JNLG number (#) 1016 is an identifier of a real JNLG corresponded to the virtual JNLG.

The real VOL number (#) 1017 is an identifier of a real VOL corresponded to the virtual VOL.

In the figure for instance, a virtual storage apparatus #10 is provided with a virtual JNLG #1111 of an M-JNLG. The virtual VOLs #11, 12, 13, and 14 belong to the JNLG #1111. Moreover, the virtual VOLs #11, 12, and 13 are corresponded to the real VOLs #31, 32, and 33 that belong to a real JNLG #3333 of the storage apparatus #1, respectively.

FIG. 11 is a view showing an example of a virtual JNLG management table 435.

Each of the first primary storage apparatus 101, the second primary storage apparatus 102, and the secondary storage apparatus 103 is provided with the virtual JNLG management table 435. The configurations of the tables can be the same. The table 435 manages a correspondence of a real JNLG of the own storage apparatus and a virtual JNLG.

The table 435 is provided with an entry of every virtual JNLG. Each entry is provided with a virtual JNLG attribute 1111, a virtual JNLG number (#) 1112, a storage apparatus number (#) 1113, and a real JNLG number (#) 1114.

The virtual JNLG attribute 1111 is an attribute of the virtual JNLG. For a virtual storage apparatus based on the primary storage apparatus, an attribute of the virtual JNLG is M-JNLG. For a secondary virtual storage apparatus based on the secondary storage apparatus, an attribute of the virtual JNLG is R-JNLG.

The virtual JNLG number 1112 is an identifier of the virtual JNLG.

The storage apparatus number 1113 is an identifier of a storage apparatus of a real JNLG corresponded to the virtual JNLG.

The real JNLG number 1114 is an identifier of a real JNLG corresponded to the virtual JNLG.

In the figure for instance, a virtual JNLG #1111 of an attribute M-JNLG is corresponded to a real JNLG #3333 of the storage apparatus #1 and a real JNLG #4444 of the storage apparatus #2.

Figure 12:
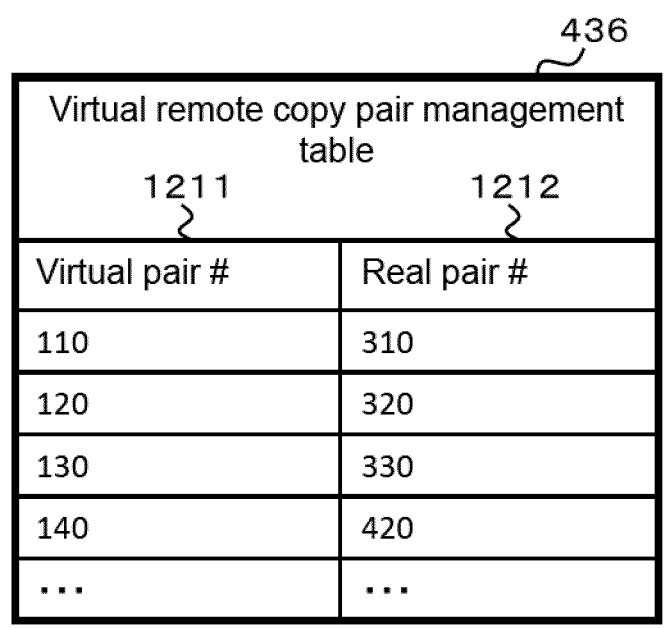
FIG. 12 is a view showing an example of a virtual pair management table 436.

FIG. 12 is a view showing an example of a virtual pair management table 436.

Each of the first primary storage apparatus 101, the second primary storage apparatus 102, and the secondary storage apparatus 103 is provided with the virtual pair management table 436. The configurations of the tables can be the same. The table 436 manages a correspondence of a real pair of the own storage apparatus and a virtual pair.

The table 436 is provided with an entry of every virtual pair. Each entry is provided with a virtual pair number (#) 1211 and a real pair number (#) 1212.

The virtual pair number 1211 is an identifier of a virtual remote copy pair.

The real pair number 1212 is an identifier of a remote copy pair to which the virtual pair is corresponded.

In the figure for instance, a virtual pair #110 and a real pair #310 are corresponded to each other.

FIG. 13 is a view showing an example of a sequence number management table 437.

Each of the first primary storage apparatus 101, the second primary storage apparatus 102, and the secondary storage apparatus 103 is provided with the sequence number management table 437 for every real JNLG that is included in the storage apparatus. The configurations of the tables can be the same. The table 437 manages a sequence number in order to ensure a write sequence from the primary host computer 104 for instance. In the present embodiment, the sequence number can be a sequence number that is managed in the real JNLG thereof. In the present figure, a table that is included in the first primary storage apparatus 101 is identified as a sequence number management table 437A, a table that is included in the second primary storage apparatus 102 is identified as a sequence number management table 437B, and a table that is included in the secondary storage apparatus 103 is identified as a sequence number management table 437C.

The table 437 is a table for every real JNLG that is included in the own storage apparatus. Each table 437 is provided with a latest sequence number 1311, an arrived sequence number 1312, a restored sequence number 1313, and a transferable sequence number 1314.

The latest sequence number 1311 is a sequence number that is included in the latest journal of a corresponded real JNLG for instance. The latest sequence number 1311 can also be a value that is counted and managed for every real JNLG by each primary storage apparatus.

The arrived sequence number 1312 is a maximum value of consecutive sequence numbers that are included in a journal of which a transmission to the secondary storage apparatus 103 has been completed for instance. The arrived sequence number 1312 is a value that is counted by the secondary storage apparatus 103. The arrived sequence number 1312 can also be transmitted from the secondary storage apparatus 103 to the primary storage apparatus that is provided with a PVOL that configures a remote copy pair with an SVOL to be shared.

The restored sequence number 1313 is a maximum value of sequence numbers that are included in a journal that has been restored to an SVOL for the secondary storage apparatus 103. The restored sequence number 1313 is a value that is counted by the secondary storage apparatus 103. The restored sequence number 1313 can also be transmitted from the secondary storage apparatus 103 to the primary storage apparatus that is provided with a PVOL that configures a remote copy pair with an SVOL to be shared.

The transferable sequence number 1314 is a maximum value of sequence numbers that can be transmitted to the secondary storage apparatus 103. The transferable sequence number 1314 can also be a value that is acquired and managed by each primary storage apparatus.

In the figure, for the M-JLG #3333 of the first primary storage apparatus 101, the latest sequence number is 106 and the transferable sequence number that has been notified of from a management apparatus is 104. The arrived sequence number is 101 and the restored sequence number is 98. Those values are acquired and transmitted by the secondary storage apparatus that is provided with the R-JLG #5555 corresponded to the M-JLG #3333. For the M-JLG #4444 of the second primary storage apparatus 101, the latest sequence number is 154 and the transferable sequence number is 149. The arrived sequence number is 141 and the restored sequence number is 130. Those values are counted and transmitted by the secondary storage apparatus that is provided with the R-JLG #6666 corresponded to the M-JLG #4444.

Figure 14:
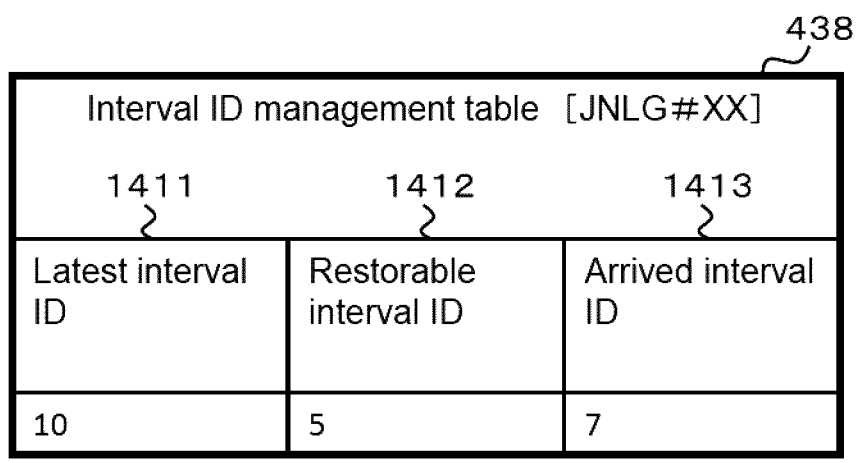
FIG. 14 is a view showing an example of an interval ID management table 438.

FIG. 14 is a view showing an example of an interval ID management table 438.

Each of the first primary storage apparatus 101 and the second primary storage apparatus 102 is provided with the interval ID management table 438 for every real JNLG that is included in the storage apparatus. The configurations of the tables can be the same. The table 438 manages an interval ID that is issued from the primary management computer 106 for instance. In the present embodiment, an interval ID is the same number that is issued at the same timing to each of the first primary storage apparatus 101 and the second primary storage apparatus 102 from the primary management computer 106, and is included in a journal as the control information together with a sequence number. The interval ID can be a consecutive number that is increased and issued for every passage of a certain time period for instance.

The table 438 is a table for every real JNLG. Each table 438 is provided with a latest interval ID 1411, a restorable interval ID 1412, and an arrived interval ID 1413.

The latest interval ID 1411 is a latest interval ID that has been received from the primary management computer 106. The interval ID can also be managed for every virtual JNLG. Moreover, a common interval ID can also be managed by a plurality of virtual JNLGs.

The restorable interval ID 1412 is an interval ID that is transmitted from the secondary storage apparatus 103 and that is imparted to a journal that can be restored. The ID 1412 is an ID that is recognized by the secondary storage apparatus 103 for every virtual JNLG. In the present embodiment, a journal is transmitted from at least one real JNLG corresponded to one virtual JNLG of a virtual primary storage apparatus to the secondary storage apparatus 103. An interval ID that is included in a journal that has arrived for every real JNLG is an arrived interval ID. The restorable interval ID 1412 is the minimum ID of the arrived interval IDs.

The arrived interval ID 1413 is an interval ID that is included in a journal of which a transmission to the secondary storage apparatus 103 has been completed. The ID is an ID that is issued by the secondary storage apparatus for every real JNLG.

FIG. 15 is a view showing an example of an interval ID integrated management table 313.

The primary management computer 106 is provided with the interval ID integrated management table 313.

The table 313 is provided with an entry of every virtual JNLG. Each entry is provided with a virtual JNLG number (#) 1451, a latest interval ID 1452, a restorable interval ID 1453, a real JNLG number (#) 1454, and an arrived interval ID 1455.

The virtual JNLG number 1451 is an identifier of a virtual JNLG. The virtual JNLG number 1451 can also be an identifier of only the vM-JNLG.

The latest interval ID 1452 is a latest interval ID that is issued to at least one real JNLG corresponded to the virtual JNLG. The virtual JNLG can also be the vM-JNLG.

The restorable interval ID 1453 is an interval ID of a journal that can be restored to at least one real JNLG corresponded to the virtual JNLG. The interval ID is the minimum ID of the arrived interval IDs 1454 that are managed by at least one real JNLG corresponded to the virtual JNLG.

The real JNLG number 1454 is an identifier of at least one real JNLG corresponded to the virtual JNLG. The interval ID is issued by the secondary storage apparatus.

The arrived interval ID 1455 is an interval ID that is managed for every real JNLG, and is a journal of which a transmission to the secondary storage apparatus 103 has been completed.

In the figure, the latest interval ID is 10. The arrived interval ID of a real JNLG #3333 is 7 and the arrived interval ID of a real JNLG #4444 is 6 for two real JNLGs #3333 and #4444 corresponded to the virtual JNLG #1111. Consequently, 6, which is the minimum ID of the two interval IDs, is the restorable interval ID of a virtual JNLG #1111.

FIG. 16 is a view showing an example of a journal management table 439.

Each of the first primary storage apparatus 101, the second primary storage apparatus 102, and the secondary storage apparatus 103 is provided with the journal management table 439. The configurations of the tables can be the same. The table 439 manages a journal of a real JNLG that is included in the own storage apparatus.

The table 439 is a table for every M-JNLG that is included in the own storage apparatus. The secondary storage apparatus 103 is provided with the table 439 for every M-JNLG corresponded to an R-JNLG that is included in the own storage apparatus. The table 439 is provided with an entry for every M-JNLG. Each entry is provided with a sequence number 1511, an interval ID 1512, a real pair number (#) 1513, a data storage area JVOL number (#) 1514, a data storage area address 1515, the transmission information 1516, and an END marker 1516.

The sequence number 1511 is a sequence number that is included in the latest journal of a corresponded M-JNLG. The sequence number 1511 is corresponded to the latest sequence number 1311 of the sequence number management table 437.

The interval ID 1512 is a latest interval ID that is included in the journal when a journal is created. The interval ID 1512 is corresponded to the latest interval ID 1411 of the interval ID management table 438.

The real pair number 1513 is an identifier of a remote copy pair that includes an M-JVOL corresponded to the journal.

The data storage area JVOL number 1514 is an identifier of an M-JVOL in which the journal has been stored.

The data storage area address 1515 is an address that indicates an area in which the journal has been stored in the M-JVOL.

The transmission information 1516 is transmission information of the journal. In the case in which the journal has been transmitted to the secondary storage apparatus 103, the transmission information is "transmitted". In the case in which the journal has not been transmitted, the transmission information is "un-transmitted". However, since the line is unnecessary in the case of the journal management table 439 that is included in the secondary storage apparatus 103, the transmission information is made to be "invalid" or the line can be erased.

The END marker 1516 is an imparting state of an END marker described later in FIG. 19. In the case in which an END marker has been imparted, the END marker is "ON". In the case in which an END marker has not been imparted, the END marker is "OFF".

FIG. 17 is a view showing an example of a movement management table 440.

Each of the first primary storage apparatus 101, the second primary storage apparatus 102, and the secondary storage apparatus 103 is provided with the movement management table 440. The configurations of the tables can be the same. The table 440 manages a real VOL that is a data VOL of a movement source and a movement destination of data by a correspondence.

The table 440 is provided with an entry for every real VOL of a movement source. Each entry is provided with a movement source storage apparatus number (#) 1611, a movement source real VOL number (#) 1613, a movement destination storage apparatus number (#) 1615, and a movement destination real VOL number (#) 1617.

The movement source storage apparatus number 1611 is an identifier of a storage apparatus to which a real VOL of a movement source belongs.

The movement source real VOL number (#) 1613 is an identifier of a real VOL of the movement source.

The movement destination storage apparatus number 1615 is an identifier of a storage apparatus to which a real VOL of a movement destination to a real VOL of the movement source belongs.

The movement destination real VOL number 1617 is an identifier of a real VOL of the movement destination.

The figure illustrates that data in a real VOL (PVOL #33) of the storage apparatus #1 is moved to a real VOL (PVOL #41) of the storage apparatus #2 for instance.

A variety of processing that is executed in the present embodiment will be described in detail with reference to FIGS. 18 to 25 in the following. Each flowchart and each sequence indicate an outline of each processing in a scope that is required for the comprehension and execution of the present invention. However, an order of processing is not restricted to an order shown in figures. In the following descriptions, a step is abbreviated to S. In the following descriptions, a table that is referred to or updated by a program of each storage apparatus can be a table in the own storage apparatus.

Figure 18:
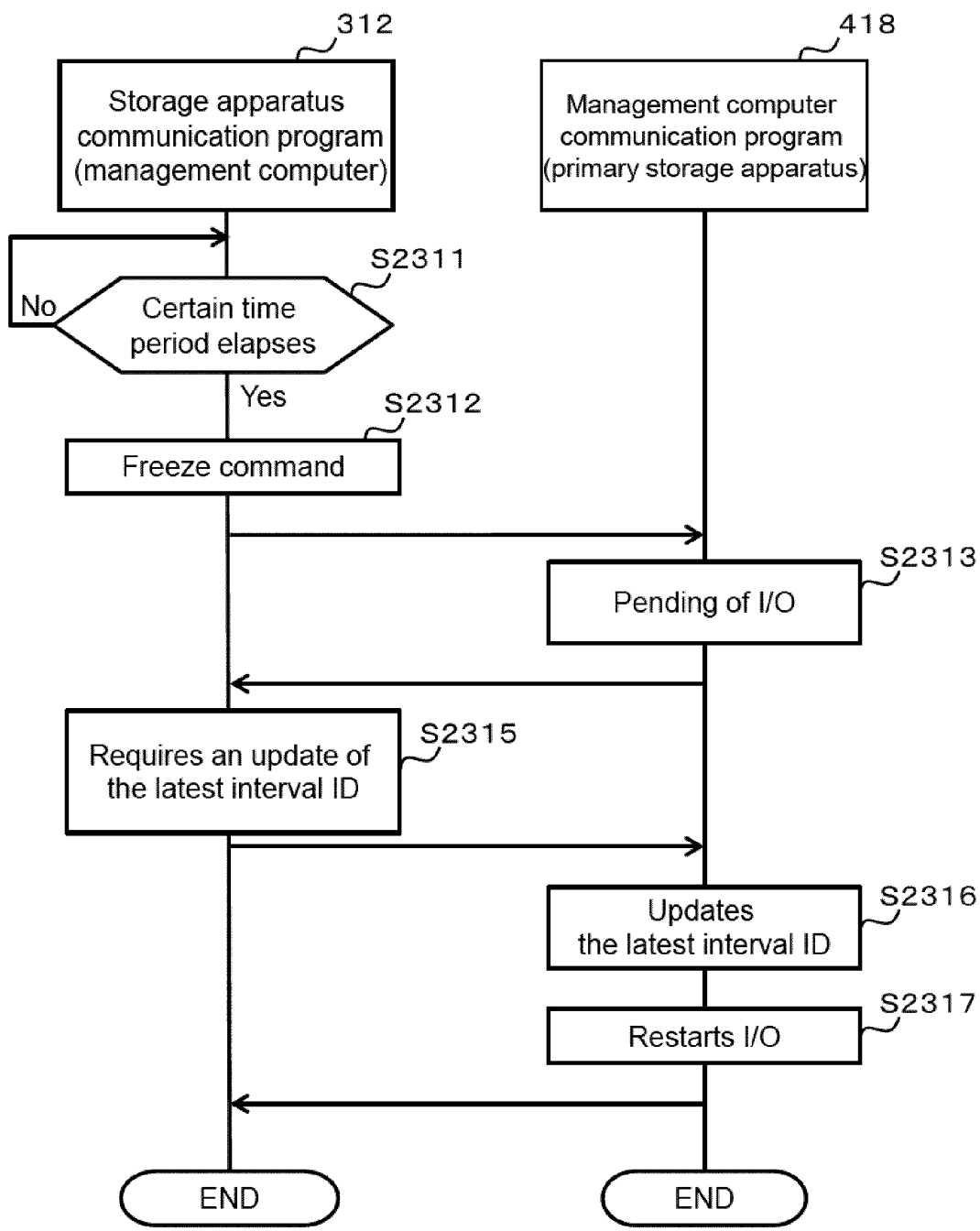
FIG. 18 is a flowchart of a latest interval ID update processing.

FIG. 18 is a flowchart of a latest interval ID update processing.

The latest interval ID update processing is a processing that is executed by each storage apparatus and a management computer. In the following descriptions, a processing between the primary management computer 106 and the primary storage apparatuses 101 and 102 as a storage apparatus will be described. However, the secondary storage apparatus 103 can be included as a storage apparatus. For instance, this processing is executed in the case in which the CPU 231 of the primary management computer 106 executes a storage apparatus communication program 312 and the CPU 301 of each storage apparatus executes a management computer communication program 418. This processing can also be executed by a storage apparatus communication program 312 of the secondary storage apparatus 103 as substitute for the primary management computer 106 and by a storage apparatus communication program 312 of other computers that are coupled to each storage apparatus. Moreover, this processing can also be executed by a storage apparatus communication program 312 of one storage apparatus of the primary storage apparatuses 101 and 102 as substitute for the primary management computer 106. Moreover, this processing can also be started at a moment when a certain time period elapses for a timer in the primary management computer 106 for instance. Moreover, a starting moment can also be arbitrary timing.

(S2311) In the case in which a certain time period elapses for the timer (Yes in the step S2311), the primary management computer 106 goes ahead with the processing to the step S2312. On the other hand, in the case in which a certain time period does not elapse for the timer (No in the step S2311), the primary management computer 106 returns the processing to the step S2311.

(S2312) The storage apparatus communication program 312 issues a freeze command to the management computer communication program 418 of each storage apparatus.

(S2313) The management computer communication program 418 receives a freeze command and temporarily takes a pending action of reception of an I/O from the primary host computer 104. Each of the primary storage apparatuses 101 and 102 responds to the storage apparatus communication program 312 of the management computer for a freeze completion.

(S2315) The storage apparatus communication program 312 increments the latest interval ID 1452 of the interval ID integrated management table 313 by one and transmits the information that includes the virtual JNLG number 1451 of the interval ID integrated management table 313 and the latest interval ID 1452 to the management computer communication program 418 of each of the primary storage apparatuses 101 and 102.

(S2316) The management computer communication program 418 receives the information of the step S2315 from the primary management computer 106 and updates the interval ID management table 438. More specifically, each of the primary storage apparatuses 101 and 102 refers to the virtual JNLG management table 435 and acquires a real JNLG #1114 corresponded to a virtual JNLG number that has been received in the step S2315 for instance. Each of the primary storage apparatuses 101 and 102 then acquires the interval ID management table 438 of the real JNLG and updates a value of the latest interval ID 1411 of the table 438 to be the latest interval ID that has been received in the step S2315. The primary management computer 106 can also transmit the information for indicating that a certain time period has elapsed to the primary storage apparatuses 101 and 102, and the primary storage apparatuses 101 and 102 can also increment a value of the latest interval ID 1411 by one in response to the transmission.

(S2317) The management computer communication program 418 restarts an I/O reception from the primary host computer 104, responds to the storage apparatus communication program 312 of the primary management computer 106, and terminates the processing.

In the above processing, a plurality of primary storage apparatuses can update the latest interval ID for every virtual JNLG at the timing that is issued by the primary management computer 106. Consequently, in the case in which the same interval ID is imparted to a virtual JNLG disposed over a plurality of primary storage apparatuses to an I/O of a certain time period, the consistency between a time when an I/O arrives and an interval ID can be maintained between the primary storage apparatuses. In addition, in the case in which an interval ID is imparted to each of the primary storage apparatuses from the primary management computer 106, a pending action of an I/O to each of the primary storage apparatuses is taken. Therefore, the consistency between a time when an I/O arrives and an interval ID can be exactly maintained between the primary storage apparatuses.

Figure 19:
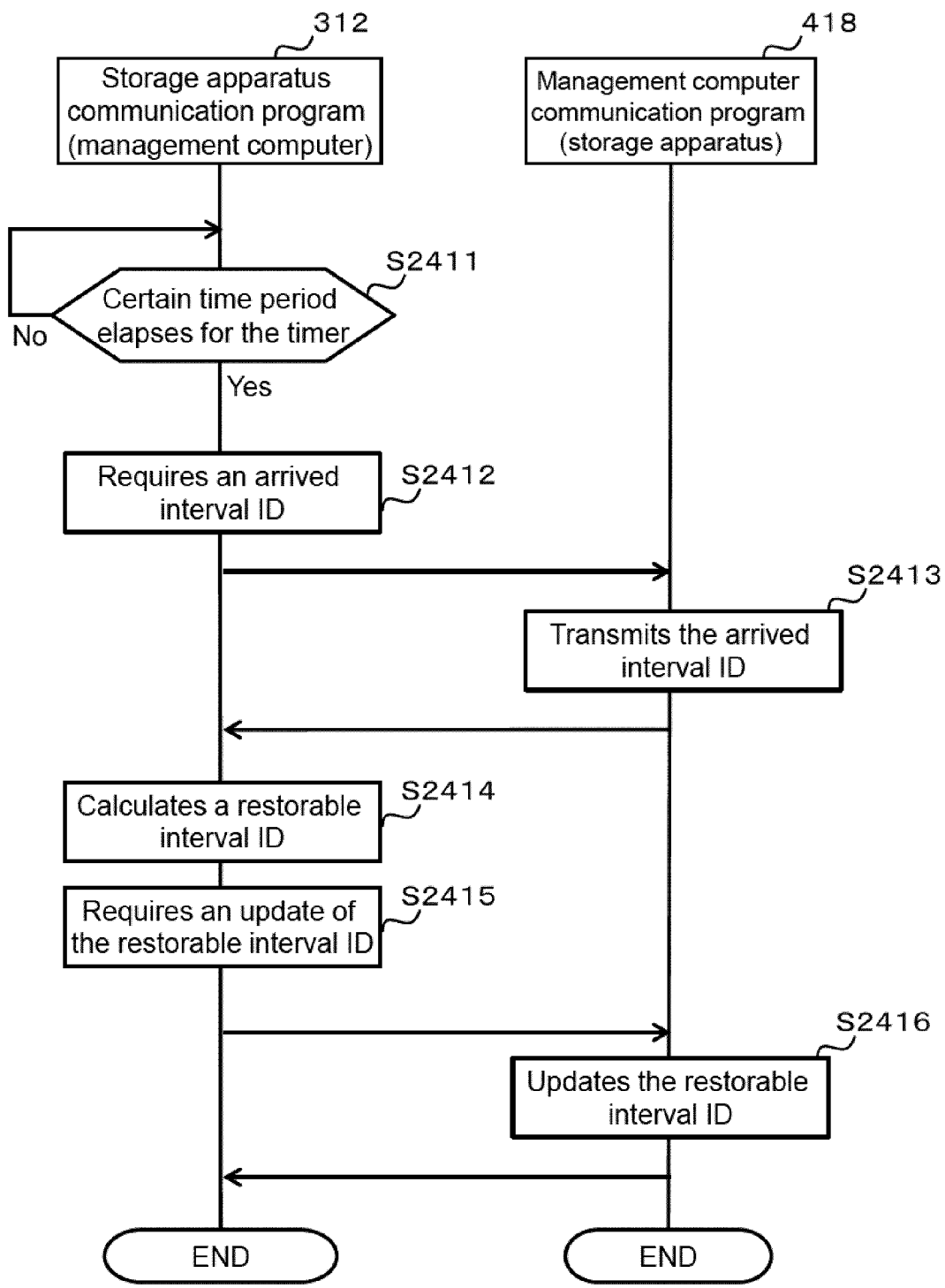
FIG. 19 is a flowchart of a restorable interval ID update processing.

FIG. 19 is a flowchart of a restorable interval ID update processing.

The restorable interval ID update processing is a processing that is executed by each storage apparatus and a management computer. In the following descriptions, a processing between the primary management computer 106 and the primary storage apparatuses 101 and 102 will be described. However, the secondary storage apparatus 103 can be included. For instance, this processing is executed in the case in which the CPU 231 of the primary management computer 106 executes a storage apparatus communication program 312 and the CPU 301 of each of the primary storage apparatuses 101 and 102 executes a management computer communication program 418. This processing can also be executed by a storage apparatus communication program 312 of the secondary storage apparatus 103 as substitute for the primary management computer 106 and by a storage apparatus communication program 312 of other computers that are coupled to each storage apparatus. Moreover, this processing can also be executed by a storage apparatus communication program 312 of one storage apparatus of the primary storage apparatuses 101 and 102 as substitute for the primary management computer 106. Moreover, this processing can also be started at a moment when a certain time period elapses for a timer in the primary management computer 106 for instance. Moreover, a starting moment can also be arbitrary timing.

(S2411) In the case in which a certain time period elapses for the timer (Yes in the step S2411), the storage apparatus communication program 312 goes ahead with the processing to the step S2412. On the other hand, in the case in which a certain time period does not elapse for the timer (No in the step S2411), the primary management computer 106 returns the processing to the step S2411.

(S2412) The storage apparatus communication program 312 refers to the interval ID integrated management table 313, specifies the real JNLG number 1454 corresponded to the target virtual JNLG to the management computer communication program 418 of each of the storage apparatuses 101 and 102, and transmits a command for requiring a transmission of an arrived interval ID.

(S2413) The management computer communication program 418 acquires the arrived interval ID 1413 of the interval ID management table 438 and transmits the interval ID to the storage apparatus communication program 312 of the primary management computer 106. At this time, the arrived interval ID 1413 can also be acquired for every real JNLG.

(S2414) The storage apparatus communication program 312 receives the arrived interval ID 1413 for every real JNLG. The storage apparatus communication program 312 then updates the arrived interval ID 1455 of the interval ID integrated management table 313 by the arrived interval ID of the received real JNLG number. The storage apparatus communication program 312 then confirms that the arrived interval ID 1413 has been received from all of the primary storage apparatuses 101 and 102, and updates the interval ID integrated management table 313. The storage apparatus communication program 312 then acquires the minimum ID of the arrived interval IDs 1455 corresponded to a plurality of real JNLG numbers 1454 that belong to the virtual JNLG for every virtual JNLG from the interval ID integrated management table 313, and modifies a value of the restorable interval ID 1453 of the interval ID integrated management table 313 to be the acquired ID.

(S2415) The primary management computer 106 transmits the restorable interval ID that has been acquired in the step S2414 for every virtual JNLG to the management computer communication program 418 of each of the storage apparatuses, and requires the update of the ID.

(S2416) The management computer communication program 418 receives the restorable interval ID of each virtual JNLG, and based on that, updates the restorable interval ID 1412 of the interval ID management table 438. Each storage apparatus 103 returns a response to the storage apparatus communication program 312 of the primary management computer 106, and terminates the processing.

By the above processing, the primary management computer 106 can compare the arrived interval IDs that have transmitted from each of the primary storage apparatuses 101 and 102, make the minimum ID, that is, an interval ID corresponded to a journal that has arrived to all R-JNLGs to be a restorable ID, and transmit the ID to the secondary storage apparatus 103. Consequently, each of the primary storage apparatuses 101 and 102 can know an interval ID corresponded to a journal that can be restored by the secondary storage apparatus 103.

Figure 20:
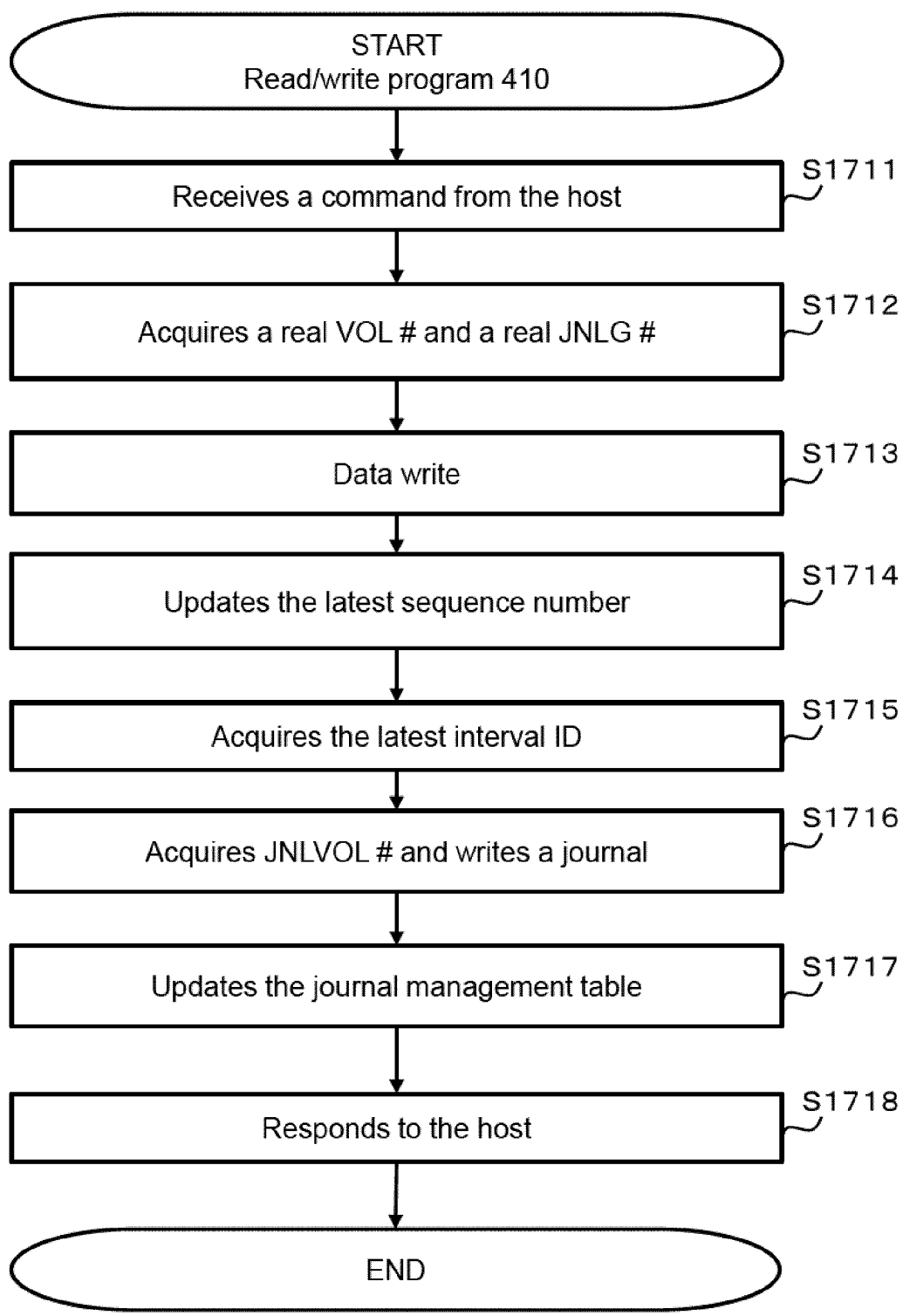
FIG. 20 is a flowchart of a host writing processing.

FIG. 20 is a flowchart of a host writing processing. This processing is executed in the case in which the CPU 231 of the storage apparatus executes the read/write program 410. In the following descriptions, the host writing processing that is executed by the first primary storage apparatus 101 will be described. However, this processing can also be executed by any storage apparatus. This processing is started by receiving a write command from the primary host computer 104.

(S1711) The program 410 receives a write request that includes a virtual VOL number of a write target from the primary host computer 104.

(S1712) The program 410 refers to the virtual VOL management table 434 and acquires a virtual JNLG number 1013 of an entry that includes a virtual VOL number 1014 that has been acquired in the step S1711, a real VOL number 1017, and a real JNLG number 1016.

(S1713) The program 410 writes the write data to a PVOL corresponded to the real VOL number 1017 that has been acquired in the step S1712. Here, writing the write data indicates writing data from a cache memory 233 to a storage device 220 after temporarily storing the write data to the cache memory 233.

(S1714) The program 410 updates the latest sequence number 1311 of the sequence number management table 437 corresponded to the real JNLG number that has been acquired in the step S1712 to be a value in which 1 has been added to the latest sequence number.

(S1715) The program 410 acquires the latest interval ID 1411 of the interval ID management table 438 corresponded to the real JNLG number that has been acquired in the step S1712.

(S1716) The program 410 creates a journal in which the control information that includes the latest sequence number that has been updated in the step S1714 and the latest interval ID that has been acquired in the step S1715 has been imparted to the write data based on the write command that has been received in the step S1711. Moreover, the program 410 refers to the JNLG management table 431A and writes the created journal to an empty area of a JVOL that is indicated by the JVOL number 713 of an entry that includes the real JNLG number 712 that has been acquired in the step S1712.

(S1717) The program 410 refers to the real pair management table 432A corresponded to the real VOL number that has been acquired in the step S1712 and acquires a real pair number 811 corresponded to a PVOL number 812. Moreover, the program 410 updates the journal management table 439. More specifically, the program 410 creates an entry of the latest sequence number 1511 that has been acquired in the step S1714, and stores the latest interval ID that has been acquired in the step S1716, a real pair number that has been acquired in the step S1717, and a JVOL number and an address of a write destination of a journal that has been created in the step S1716 into the entry. More specifically, the program 410 makes the transmission information line 1516 to be "un-transmitted".

(S1718) The program 410 returns a response to the write request to the primary host computer 104, and terminates the processing.

By the above processing, in the case in which a write command is received from the host computer, a journal that includes the write data based on the write command can be created. In addition, the write data and the sequence number and the interval ID of every JNLG can be corresponded to each other for each journal.

Figure 21:
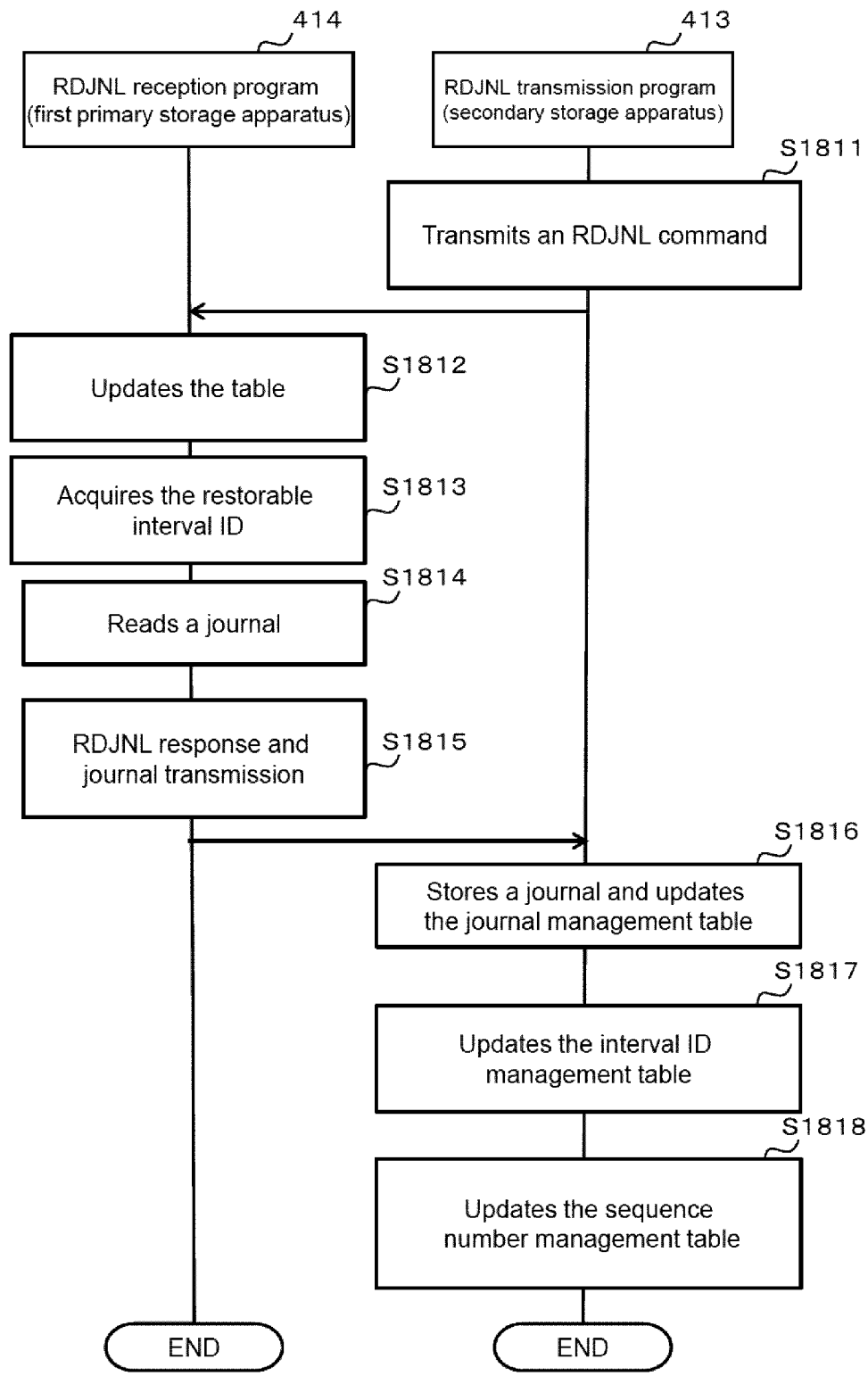
FIG. 21 is a flowchart of a journal transmission processing between storage apparatuses.

FIG. 21 is a flowchart of a journal transmission processing between storage apparatuses. In the following descriptions, a journal transmission processing between the first primary storage apparatus 101 and the secondary storage apparatus 103 will be described. For instance, this processing is executed in the case in which the CPU 231 of the primary storage apparatus 101 executes the RDJNL (read journal) reception program 414 and the CPU 231 of the secondary storage apparatus 103 executes the RDJNL (read journal) transmission program 413. A similar journal transmission processing can also be executed between the second primary storage apparatus 102 and the secondary storage apparatus 103. Moreover, this processing can also be started for every R-JNLG at a moment when a certain time period elapses for a timer in the secondary storage apparatus 103 for instance. Moreover, a starting moment can also be arbitrary timing. Moreover, it is also possible that each program is not terminated in each case and the following operations are repeated at certain time intervals.

(S1811) The RDJNL transmission program 413 acquires the restored sequence number 1313 of the sequence number management table 437C corresponded to the JNLG and the arrived interval ID, and transmits an RDJNL (read journal) command of an M-JNLG corresponded to the target R-JNLG that includes the sequence number and the interval ID that have been acquired to the first primary storage apparatus 101.

(S1812) The RDJNL reception program 414 receives an RDJNL command and updates the table 437. More specifically for instance, the RDJNL reception program 414 updates the restored sequence number 1313 of the sequence number management table A corresponded to the target M-JNLG and the arrived interval ID 1455 of the interval ID management table 438 based on the sequence number and the interval ID that are included in the RDJNL command.

(S1813) The RDJNL transmission program 413 acquires the restorable interval ID 1412 from the interval ID management table 438 of the target M-JNLG.

(S1814) The RDJNL transmission program 413 acquires a journal that has not yet been transmitted to the secondary storage apparatus 103. More specifically for instance, the RDJNL reception program 414 identifies a JVOL in which the transmission information 1516 of the journal management table 439 of the target M-JNLG includes "un-transmitted", acquires a JVOL number 1514 and an address 1515 of the data storage area that have not been transmitted, and reads a journal that includes data stored into the area.

(S1815) The RDJNL reception program 414 transmits the restorable interval ID that has been acquired in the step S1813 and a journal that has been read in the step S1814 as a response of the RDJNL command (an RDJNL response) that has been received in the step S1812 to the secondary storage apparatus 103, and terminates the processing.

(S1816) The RDJNL transmission program 413 receives the RDJNL response, writes a journal that is included in the response to a JVOL that belongs to the target R-JNLG, and updates the journal management table 439. More specifically for instance, the RDJNL transmission program 413 updates a sequence number 1511, an interval ID 1512, and a real pair ID 1513 of the journal management table 439 based on the control information of the journal, and updates a data storage area JVOL number 1514 and a data storage area address 1515 of the journal management table 439 based on the JVOL number and the physical address that have been written in the present step. Moreover, the RDJNL transmission program 413 sets an invalid value to the transmission information 1516.

(S1817) The RDJNL transmission program 413 modifies a value of the restorable interval ID 1412 of the interval ID management table 438 to be the restorable interval ID that has been received in the step S1816.

(S1818) The RDJNL transmission program 413 acquires the latest sequence number (maximum value) from the sequence number 1511 of the journal management table 439, modifies a value of the arrived sequence number 1313 of the sequence number management table 437 to be the latest sequence number that has been acquired, and terminates the processing.

By the above processing, a journal that has not been transmitted can be transmitted to the secondary storage apparatus, and the restorable interval ID for every R-JNLG corresponded to the M-JNLG can be transmitted to the secondary storage apparatus 103. Moreover, the secondary storage apparatus 103 can manage the latest sequence number of a journal that has arrived as an arrived sequence number of every own R-JNLG and can transmit the sequence number to the primary storage apparatus.

Figure 22:
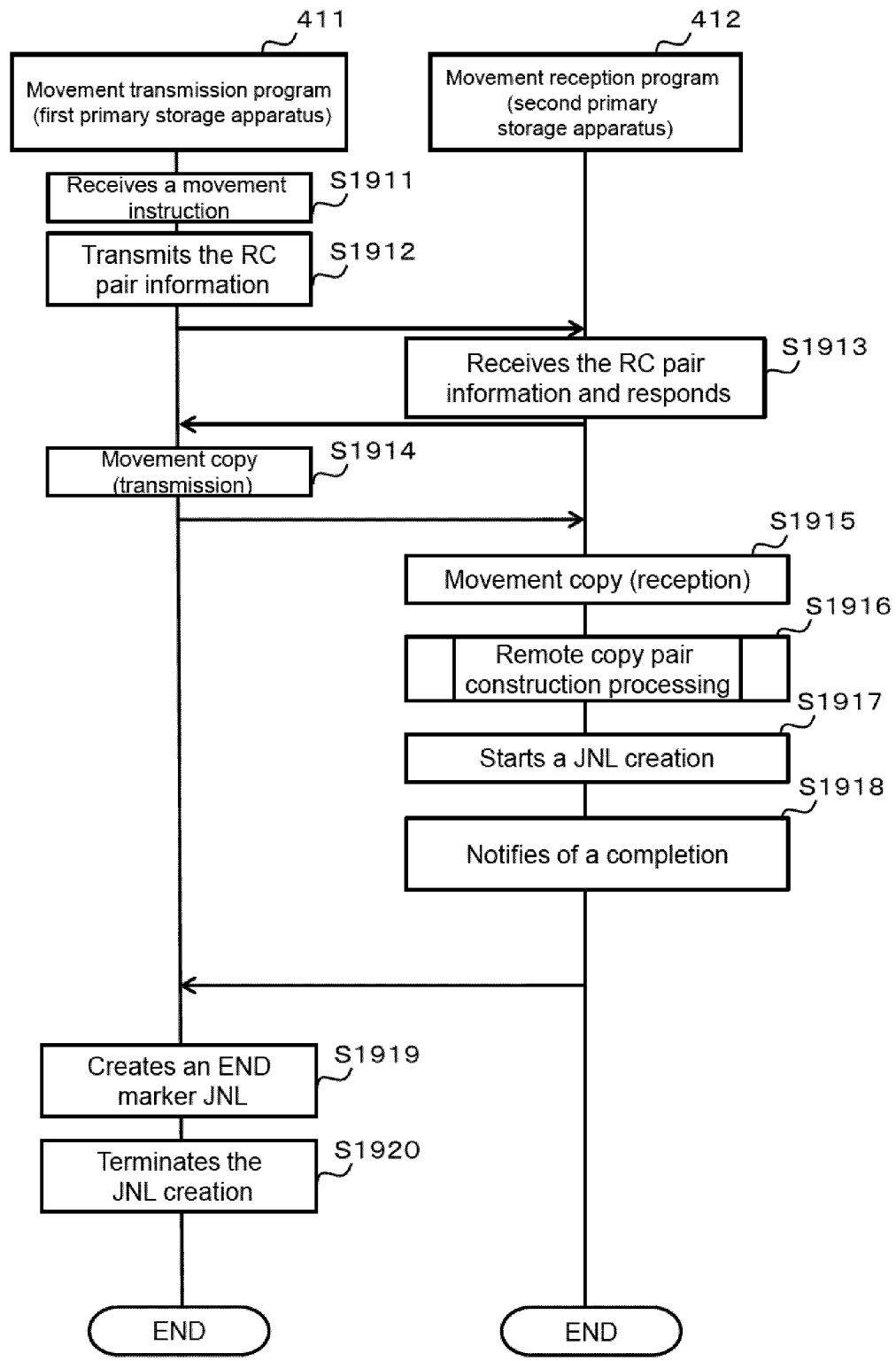
FIG. 22 is a flowchart of a data movement processing of a VOL between primary storage apparatuses.

FIG. 22 is a flowchart of a data movement processing of a VOL between primary storage apparatuses.

In the following descriptions, a data movement processing of a VOL between the first primary storage apparatus 101 and the second storage apparatus 102 will be described. For instance, this processing is executed in the case in which the CPU 231 of the primary storage apparatus 101 executes the movement transmission program 411 and the CPU 231 of the second primary storage apparatus 102 executes the movement reception program 412.

This processing is started at a moment when the management IF 242 of the first primary storage apparatus 101 receives a movement instruction from the primary management computer 106 for instance. However, this configuration is not restricted.

(S1911) The movement transmission program 411 receives a movement instruction of data of a P-VOL (VOL data), acquires a movement source real VOL number that indicates a movement source storage apparatus number and a movement source PVOL that are included in the movement instruction and a movement destination real VOL number that indicates a movement destination storage apparatus number and a movement destination PVOL, and stores a movement source storage apparatus number 1611, a movement source real VOL number 1613, a movement destination storage apparatus number 1615, and a movement destination real VOL number 1617 into the movement management table 440.

(S1912) The movement transmission program 411 transmits the remote copy pair information based on the movement instruction of VOL data that has been received in the step S1911 to the second storage apparatus 102. More specifically for instance, the remote copy pair information includes a movement source storage apparatus number and a movement source PVOL number, a movement destination storage apparatus number and a movement destination real VOL number that are included in the movement instruction of VOL data, and a pair apparatus number 814 and an SVOL number 815 that are corresponded to a movement source PVOL for the real pair management table 432A.

(S1913) The movement reception program 412 receives the remote copy pair information, and updates the movement source storage apparatus number 1611, the movement source real VOL number 1613, the movement destination storage apparatus number 1615, and the movement destination real VOL number 1617 of the movement management table 440 by the remote copy pair information. After a completion of the update, the second primary storage apparatus 102 transmits a response to the first primary storage apparatus 101.

(S1914) The movement transmission program 411 reads the VOL data of the movement source PVOL and transmits the data to the second primary storage apparatus 102. For the data copy, a transmission system of data (synchronous type or asynchronous type), a transmission unit of data, the presence or absence of a response, and a method of a transmission management are not restricted in particular. At this time, the I/O from the host computer 104 is duplicated to the movement source PVOL of the first primary storage apparatus and the movement destination PVOL of the second primary storage apparatus.

(S1915) The movement reception program 412 receives the VOL data from the first primary storage apparatus 101 and stores the data into the movement destination PVOL.

Figure 23:
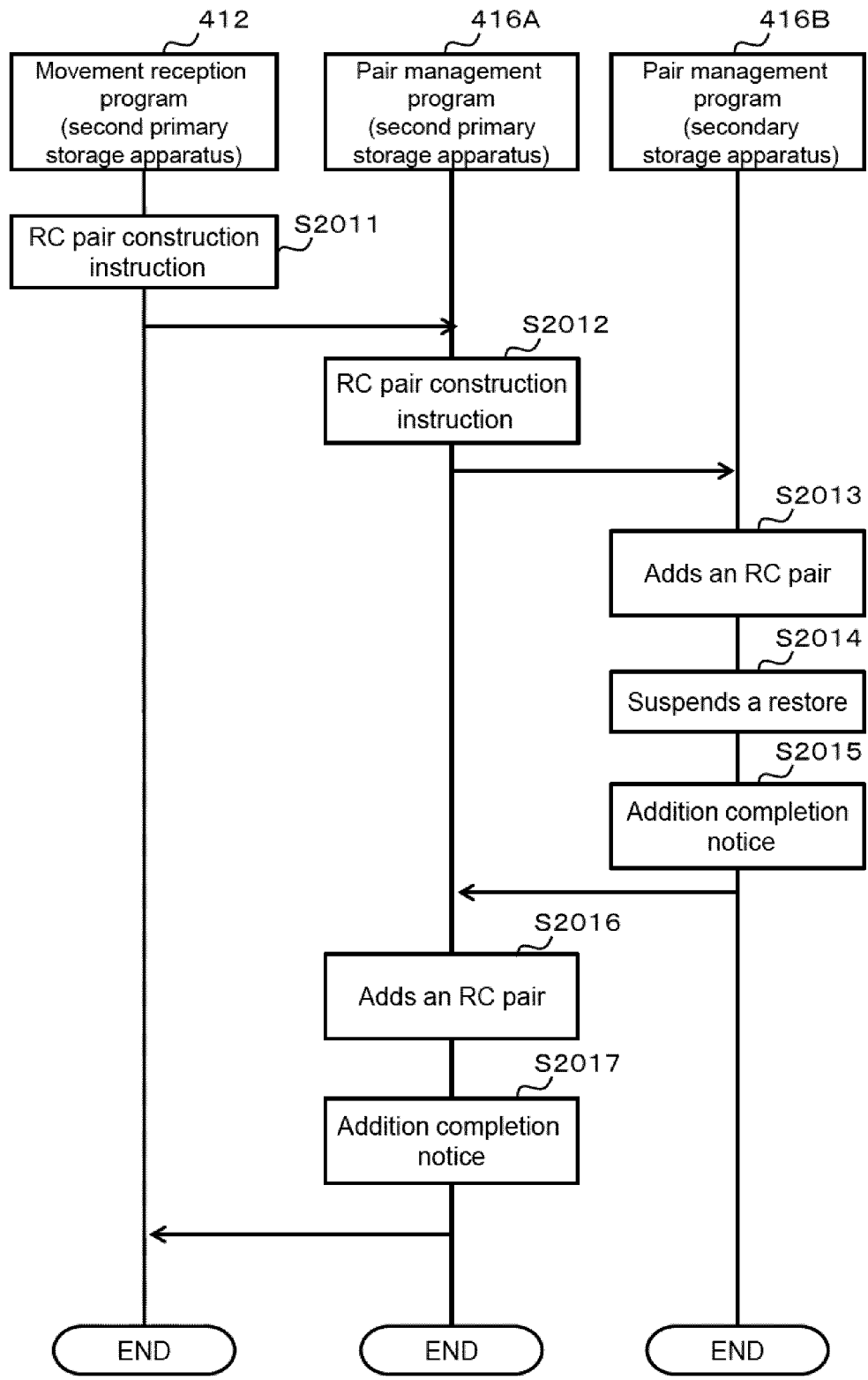
FIG. 23 is a flowchart of a remote copy pair construction processing.

(S1916) The movement reception program 412 executes a remote copy pair construction processing. The details are shown in FIG. 23. By the processing, a remote copy pair of the movement destination PVOL with the SVOL is constructed.

(S1917) The movement reception program 412 starts a creation of a journal to a new M-JNLG corresponded to the movement destination PVOL. More specifically, the movement reception program 412 makes a JNL creation flag 818 of the real pair management table 432B to be "ON" and starts an acquisition of a journal.

(S1918) The movement reception program 412 notifies the first primary storage apparatus 101 of the movement of VOL data and a completion of the remote copy pair construction processing.

(S1919) The movement transmission program 411 receives the notice of the step S1918 and updates the journal management table 439. More specifically for instance, the movement transmission program 411 creates an entry corresponded to the latest sequence number 1511 and makes the END marker 1516 to be "ON". The journal corresponded to the sequence number is created as a journal in which data does not exist.

(S1920) The movement transmission program 411 stops a creation of a journal corresponded to the movement source PVOL, and terminates the processing.

By the above processing, VOL data is moved from the first primary storage apparatus 101 to the second primary storage apparatus 102. Moreover, in accordance with the movement of the VOL data, a movement destination PVOL and an SVOL that makes a remote copy pair with a movement source PVOL can be constructed as a new remote copy pair. Moreover, an END marker corresponded to the last sequence number is imparted to a journal that is stored into a JVOL of an M-JNLG to which the movement source PVOL belongs as the control information.

FIG. 23 is a flowchart of a remote copy pair construction processing.

This processing is a processing of the step S1916 of the data movement processing. For instance, this processing is executed in the case in which the CPU 231 of the second primary storage apparatus 102 executes the movement reception program 412 and the pair management program 416A and the CPU 231 of the secondary storage apparatus 103 executes the pair management program 416B.

(S2011) The movement reception program 412 instructs the own pair management program 416B to construct a remote copy pair. More specifically for instance, the movement reception program 412 transmits a remote copy pair construction instruction for constructing a movement destination PVOL and an SVOL that configures a remote copy pair with a movement source PVOL as a new remote copy pair to the pair management program 416A of the second storage apparatus 102 based on the remote copy pair that has been received in the step S1913. This instruction includes an instruction for making a restore flag to be "OFF".

(S2012) The pair management program 416A receives the remote copy pair construction instruction, and decides a real pair number of a new remote copy pair, an M-JNLG number that is a destination to which the movement destination PVOL outputs a journal, and an R-JNLG number that is a destination to which the SVOL outputs a journal.

A real pair ID can be an arbitrary number and can also be decided by other methods. Moreover, the M-JNLG number and the R-JNLG number can be decided by any method. More specifically for instance, the M-JNLG number and the R-JNLG number can be decided by a user instruction. In the case in which there is another remote copy pair that belongs to the same virtual JNLG in the own storage apparatus, an M-JNLG and an R-JNLG to which the real VOL belongs can also be used. Moreover, an M-JNLG and an R-JNLG in which a load of the CPU is small can also be used.

The pair management program 416A then transmits the remote copy pair construction instruction that includes a PVOL number and an SVOL number of a new remote copy pair, the real pair ID that has been decided in the present step, and the M-JNLG number and the R-JNLG number to the pair management program 416B of the secondary storage apparatus 103. The remote copy pair construction instruction includes an instruction for making a restore flag to be "OFF" and for making a pair status to be "PAIR".

(S2013) The pair management program 416B receives the remote copy pair construction instruction, and updates the real pair management table 432C. More specifically, the pair management program 412 updates a real pair number 811, a PVOL number 812, a real M-JNLG number 813, an SVOL number 815, a real R-JNLG number 816, and a pair status 817 based on the remote copy pair construction instruction, updates a pair apparatus number 814, sets an invalid value to a JNL creation flag 818, and sets "OFF" to a JNL restore flag based on an instruction from the second primary storage apparatus 102 of a transmission source.

(S2014) The pair management program 416B sets a remote copy pair that has been added to in the step S2013 to be in a status for suspending a restore.

(S2015) The pair management program 416B transmits a remote copy pair addition completion notice as a response of the step S2012 to the second primary storage apparatus 102, and terminates the processing.

(S2016) The pair management program 416A receives a remote copy pair addition completion notice, and updates the real pair management table 432B. More specifically for instance, the pair management program 416A updates a real pair number 811, a PVOL number 812, a real M-JNLG number 813, an SVOL number 815, a real R-JNLG number 816, and a pair status 817 of the table 432A based on the remote copy pair construction instruction, sets an ID of the secondary storage apparatus 103 to a pair apparatus number 834, makes a JNL creation flag 838 to be "ON", and sets an invalid value to a JNL restore flag.

(S2017) The pair management program 416A transmits a remote copy pair addition completion notice as a response of the remote copy pair construction instruction of the step S2011 to the movement reception program 412, and terminates the processing. The movement reception program 412 then receives the response from the pair management program 416B, terminates the remote copy pair construction processing, and goes ahead with the processing to the step S1917 (see FIG. 20).

By the above processing, a new remote copy pair that is made of a movement destination PVOL and an SVOL can be added for the secondary storage apparatus 103 by an instruction of the second primary storage apparatus 102 that is provided with a movement destination PVOL. After adding the new remote copy pair, the secondary storage apparatus 103 temporarily suspends a restore of a journal to an SVOL from a JVOL of an R-JNLG corresponded to an M-JNLG to which the movement destination PVOL belongs. By this configuration, a restore of a journal to an SVOL from a JVOL of an R-JNLG corresponded to an M-JNLG to which the movement destination PVOL belongs can be prevented from being started before a restore of a journal to an SVOL from a JVOL of an R-JNLG corresponded to an M-JNLG to which the movement source PVOL belongs is completed.

Figure 24:
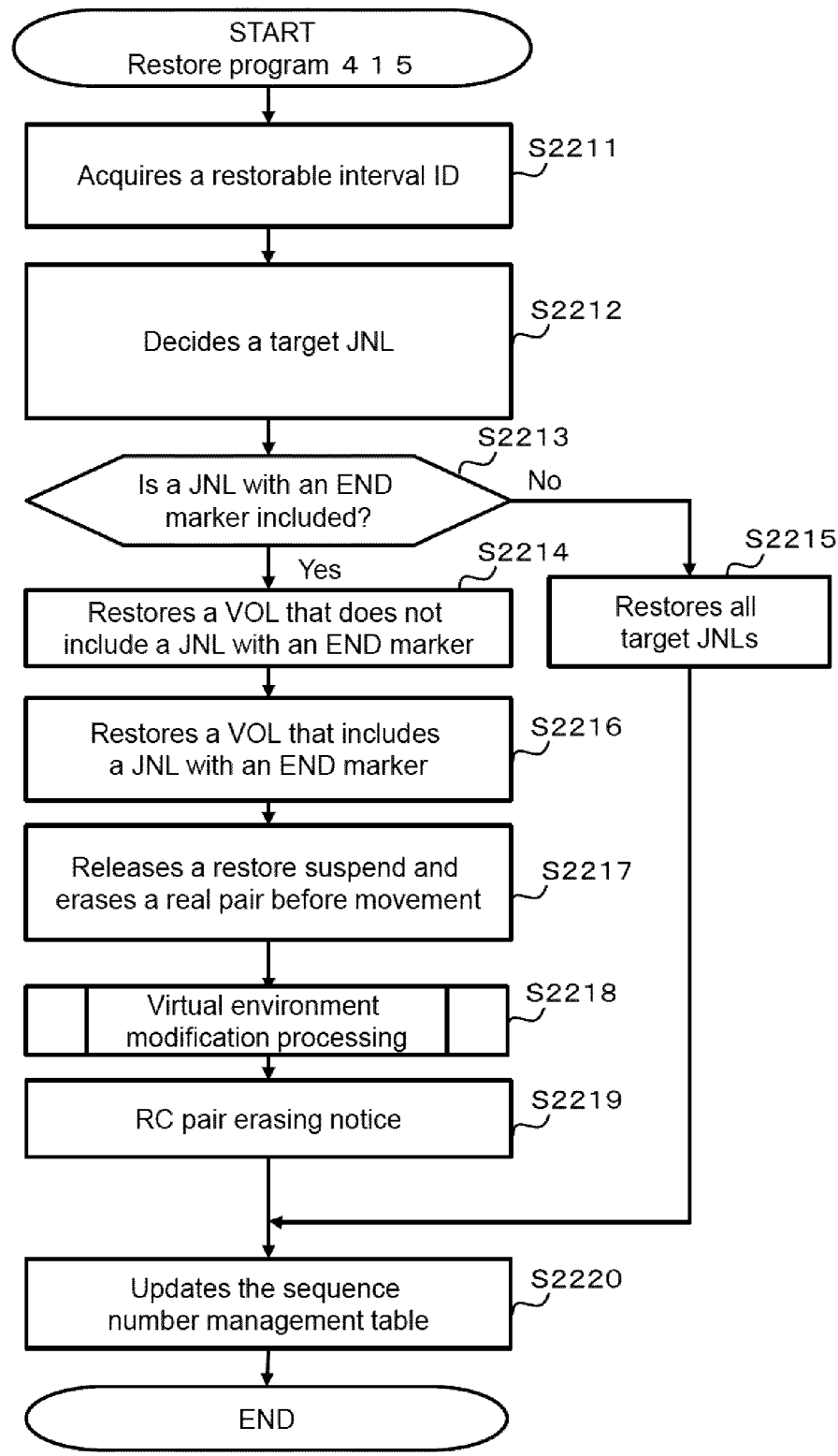
FIG. 24 is a flowchart of a restore processing.

FIG. 24 is a flowchart of a restore processing.

For instance, the restore processing is executed in the case in which the CPU 231 of the secondary storage apparatus 103 executes the restore program 415A. This processing is executed for every JNLG that is included in the secondary storage apparatus 103. Moreover, this processing is started for at a moment when a certain time period elapses for a timer that is held in the secondary storage apparatus 103 for instance. Moreover, a starting moment can also be arbitrary timing. The restore processing of the JNLG of 1 will be described in the following.

(S2211) The restore program 415A acquires the restorable interval ID 1412 from the interval ID management table 438.

(S2212) The restore program 415A refers to the journal management table 439, extracts an entry that includes an interval ID 1512 that matches with the restorable interval ID that has been acquired, and makes a journal of the entry that has been extracted to be a restore target journal.

(S2213) The restore program 415A determines whether or not a journal in which an END marker 1516 is "ON" is include in the restore target journals that have been extracted in the step S2212. In the case in which a journal in which an END marker 1516 is "ON" is include as a result of the determination (Yes in the step S2213), the secondary storage apparatus 103 goes ahead with the processing to the step S2214. On the other hand, in the case in which a journal in which an END marker 1516 is "ON" is not include as a result of the determination (No in the step S2213), the secondary storage apparatus 103 restores all of the restore target journals in the step S2215, and goes ahead with the processing to the step S2219.

(S2214) The restore program 415A restores a journal in which an END marker 1516 has been determined as "ON" in the step S2213 and all of journals in which real pair numbers 1513 are different to an SVOL in an order of a sequence number for the restore target journals that have been extracted in the step S2212. More specifically for instance, in the example of FIG. 16, in the case in which a journal of which an interval ID is "10" is a restore target journal, a real pair number 1513 of a journal 1522 in which an END marker is "ON" is "330". Consequently, a journal 1520 in which a real pair number 1513 is "330" is not restored to an SVOL, and a journal 1521 in which a real pair number 1513 is "320" is restored to an SVOL.

(S2216) The restore program 415A restores journals up to a journal immediately before a journal that includes an END marker for a remote copy pair (a real pair number 1513) in which an END marker 1516 is "ON" for the journal management table 439. More specifically for instance, in the example of FIG. 16, the restore program 415A restores journals of which a sequence number is "104" and "105" that are journals immediately before a journal of "106" in which an END marker 1516 is "ON" to an SVOL for a remote copy pair in which an END marker 1516 is "ON" and a real pair number 1513 is "330".

(S2217) The restore program 415A releases a restore suspend of a remote copy pair of the movement destination PVOL to an SVOL, and erases the pair information of a remote copy pair of the movement source PVOL. More specifically for instance, the restore program 415A makes the real pair number 1513 of a journal in which an END marker 1516 is "ON" that has been extracted in the step S2213 to be a pre-movement real pair based on the journal management table 439. The restore program 415A then acquires another real pair number 811 in which a real pair number 811 of a pre-movement real pair and an SVOL number 815 overlap as a post-movement real pair, modifies a JNL creation flag 818 corresponded to the post-movement real pair to be "ON", and erases the pair information (entry) of a pre-movement real pair number for the real pair management table 432C. More specifically, in the example of FIG. 5, a remote copy pair (ID=330) and a remote copy pair (ID=410) are remote copy pairs that include an SVOL (ID=53). The secondary storage apparatus 103 acquires a movement destination real pair (ID=410) from a movement source real pair (ID=330) that is a remote copy pair in which an END marker has been imparted. At this time, the movement destination real pair (ID=410) suspends a restore. After starting a restore of the movement destination real pair (ID=410), the secondary storage apparatus 103 erases the pair information of the movement source real pair (ID=330).

Figure 25:
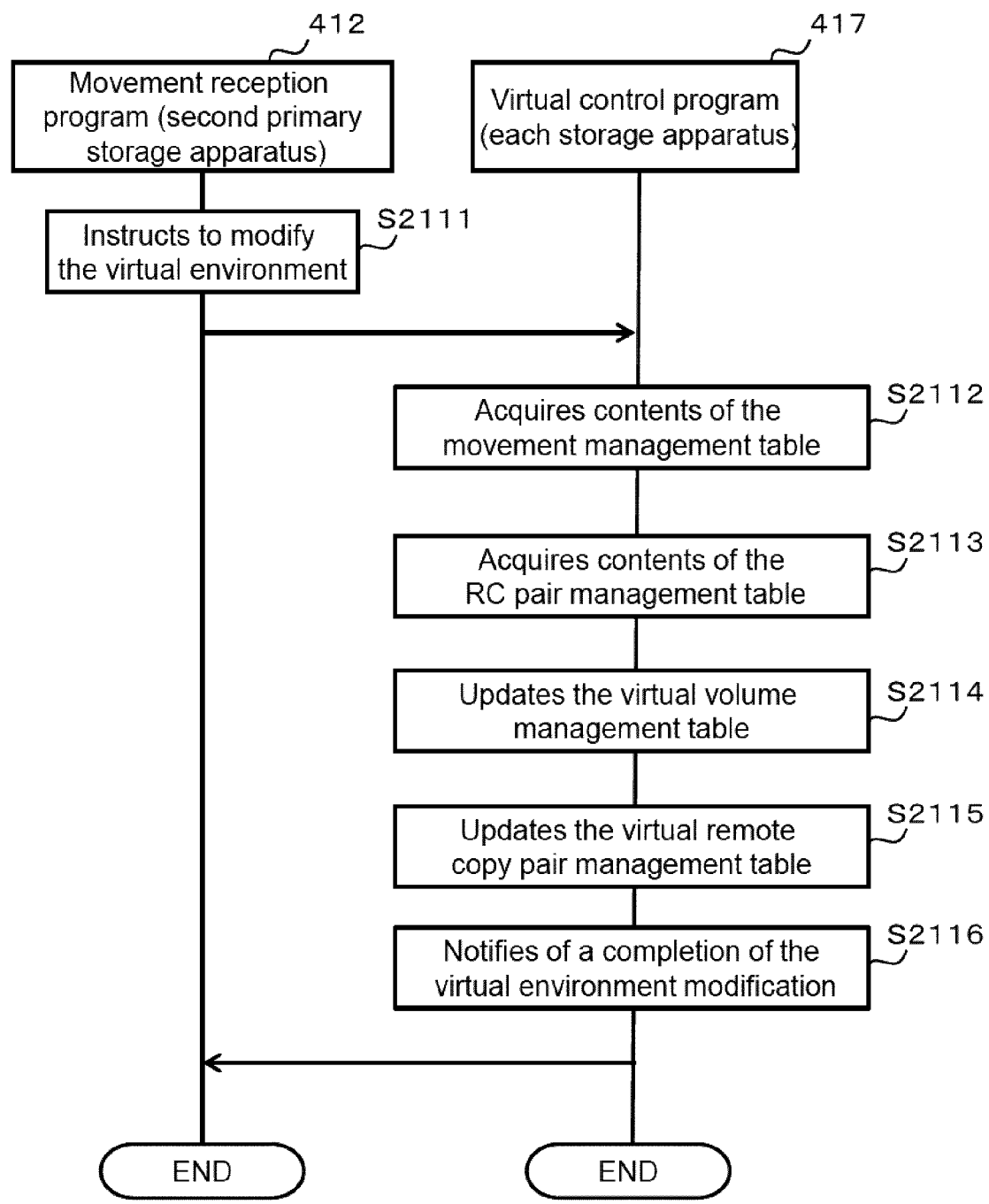
FIG. 25 is a flowchart of a virtual environment modification processing.

(S2218) The restore program 415A instructs the virtual control program 417 that is included in each of the first primary storage apparatus 101, the second primary storage apparatus 102, and the secondary storage apparatus 103 to execute the virtual environment modification processing. The details are shown in FIG. 25.

(S2219) The restore program 415A transmits an erasing notice of a movement source real pair to the first storage apparatus 101. The first storage apparatus 101 then receives the erasing notice of a movement source real pair, executes the pair management program 416, and updates the real pair management table 432A.

(S2220) The restore program 415A updates the sequence number management table 437, and terminates the processing. More specifically for instance, the restore program 415A modifies a value of a restored sequence number 1313 of the table 437 to be the maximum value of sequence numbers of journals that have been restored in the steps S2214 to S2216. The restored sequence number 1313 is used for erasing a journal that has been stored in the M-JNLG and the R-JNLG.

By the above processing, the consistency of data can be maintained for a restore to an SVOL of a journal by a remote copy pair before and after a movement of a PVOL. More specifically, by creating a journal that includes an END marker, for a remote copy pair in which a journal with a marker that includes an END marker exists, that is, a remote copy pair of a movement source PVOL and an SVOL, journals up to a journal immediately before an END marker can be restored to the SVOL for the journals of a restore target. After the restore is terminated, suspending a restore of a journal of a remote copy pair of a movement destination PVOL and an SVOL can be released.

FIG. 25 is a flowchart of a virtual environment modification processing.

The virtual environment modification processing is a processing of the step S2218 of the restore processing. For instance, this processing is executed in the case in which the CPU 231 of the second primary storage apparatus 102 executes the movement reception program 412 and the CPU 231 of each of the first primary storage apparatus 101, the second primary storage apparatus 102, and the secondary storage apparatus 103 executes the virtual control program 417.

(S2111) The movement reception program 412 transmits an instruction of the virtual environment modification processing to each of the first primary storage apparatus 101, the second primary storage apparatus 102, and the secondary storage apparatus 103.

(S2112) The virtual control program 417 acquires a movement source real storage apparatus number 1611, a movement source real VOL number 1613, a movement destination real storage apparatus number 1615, and a movement destination real VOL number 1617 of the movement management table 440. More specifically, in the examples of FIG. 5 and FIG. 16, the virtual control program 417 recognizes a movement source storage apparatus (ID=1), a movement source real VOL (ID=33), a movement destination storage apparatus (ID=2), and a movement destination real VOL (ID=41) of the movement management table 440.

(S2113) The virtual control program 417 acquires the information that has been acquired in the step S2112, a real pair number 811 of an entry that matches with a PVOL number 812 of the real pair management table 432, a real M-JNLG number 813, a pair apparatus number 814, an SVOL number 815, and a real R-JNLG number 816. In the example of FIG. 5, the virtual control program 417 of the first primary storage apparatus 101 (ID=1) acquires a real pair number (ID=330), a real M-JNLG (ID=3333), a pair apparatus (ID=3), an SVOL (ID=53), and a real R-JNLG (ID=5555) that are corresponded to a PVOL number that matches with the movement source real VOL (ID=33) that has been acquired in the step S2112 for the real pair management table 432A.

In the example of FIG. 5 moreover, the virtual control program 417 of the second primary storage apparatus 102 (ID=2) acquires a real pair number (ID=410), a real M-JNLG (ID=4444), a pair apparatus (ID=3), an SVOL (ID=53), and a real R-JNLG (ID=6666) as a result of retrieving a PVOL (ID=41) that is corresponded to a PVOL number that matches with a movement destination real VOL (ID=41) that has been acquired in the step S2112 for the real pair management table 432B. The storage apparatuses can also share the information that has been acquired by each of the storage apparatuses. (S2114) The virtual control program 417 updates the virtual VOL management table 434 based on the information that has been acquired in the steps S2112 and S2113. More specifically for instance, the virtual control program 417 modifies a real storage apparatus number 1015 of an entry that is corresponded to a real VOL number 1017 that matches with a movement source real VOL number that has been acquired in the step S2112 to be a movement destination storage apparatus number that has been acquired in the step S2112. Moreover, the virtual control program 417 modifies a real JNLG number 1016 to be a real M-JNLG number of a movement destination that has been acquired in the step S2113, and modifies a real VOL number 1017 to be a movement destination real VOL number that has been acquired in the step S2112. Moreover, the virtual control program 417 modifies a real JNLG number 1016 of an entry that is corresponded to a real VOL number 1017 that matches with a movement source SVOL number to be a movement destination R-JNLG number. In the example of FIG. 5, a storage apparatus number is modified from 1 to 2, an M-JNLG number is modified from 3333 to 4444, a real VOL number is modified from 33 to 41, and a real JNLG number is modified from 5555 to 6666.

(S2115) The virtual control program 417 updates a real pair number that matches with a movement source real pair number that has been acquired in the step S2113 to be a movement destination real pair number for the virtual pair management table 436. In the examples of FIG. 5 and FIG. 12, a real remote copy pair that is corresponded to a virtual remote copy pair (ID=130) is modified from ID=330 to ID=410.

(S2116) The virtual control program 417 transmits a completion notice of the virtual environment modification processing to the movement reception program 412 of the second primary storage apparatus 102, and terminates the processing.

By the above processing, even in the case in which a remote copy pair between a PVOL and an SVOL and a pair between an M-JNLG to which a PVOL belongs and an R-JNLG to which an SVOL belongs are modified in accordance with a movement processing of a PVOL between two primary storage apparatuses, the processing can be continued without modifying a virtual remote copy pair.

Embodiment 2

An embodiment 2 will be described with reference to FIGS. 26 to 30 in the following. In the figures, elements equivalent or similar to those of the embodiment 1 are numerically numbered similarly for the descriptions. The detailed descriptions of the equivalent elements are omitted. Moreover, the configurations equivalent or similar to those of the embodiment 1 are omitted in some cases.

Figure 26:
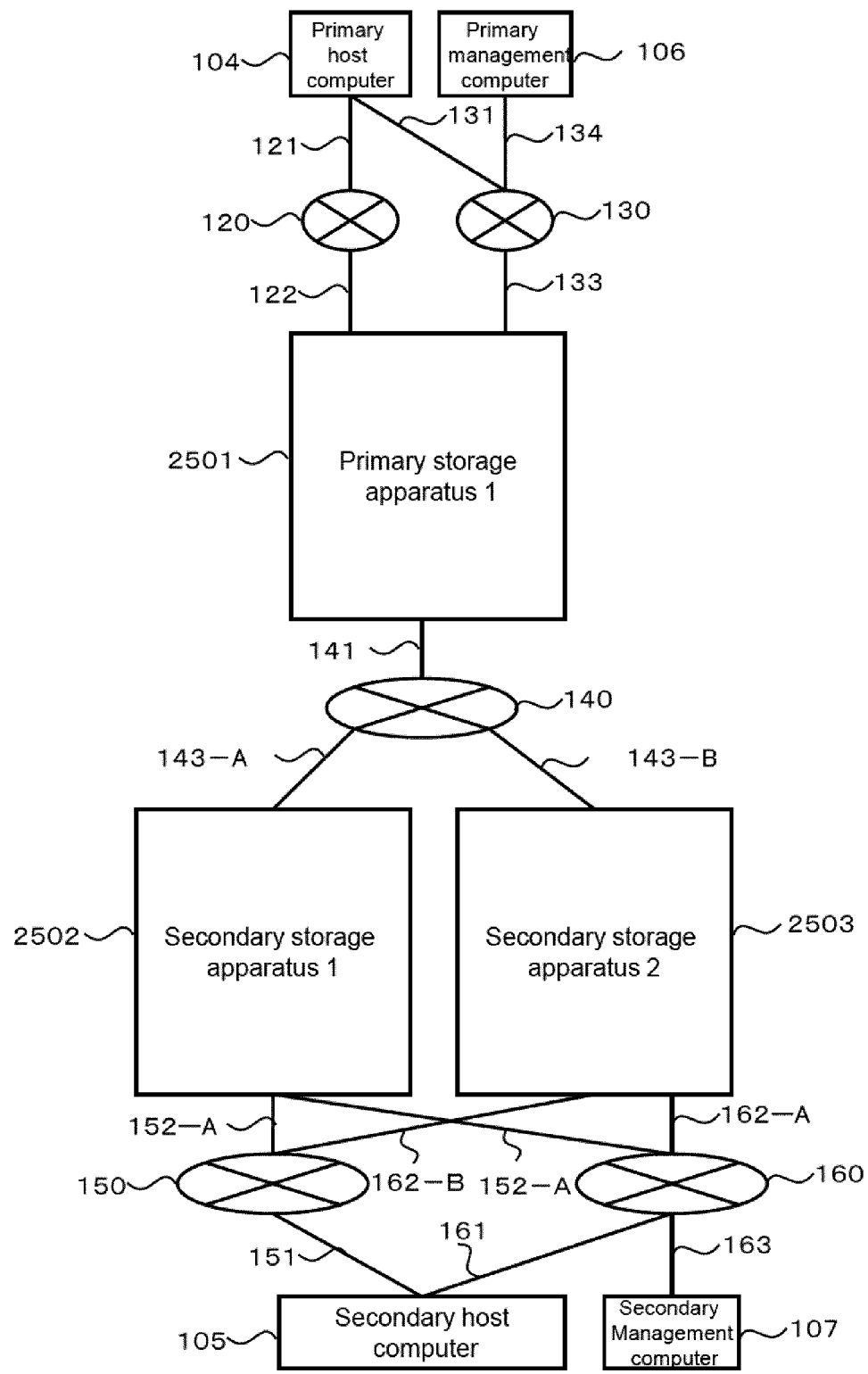
FIG. 26 is a block diagram showing a computer system in accordance with an embodiment 2.

FIG. 26 is a block diagram showing a computer system in accordance with an embodiment 2.

The primary storage system is provided with one or a plurality of primary storage apparatuses 2501, one or a plurality of primary host computers 104, and one or a plurality of primary management computers 106 for instance. The secondary storage system is provided with one or a plurality of first secondary storage apparatuses 2502, one or a plurality of second secondary storage apparatuses 2503, one or a plurality of secondary storage apparatuses 103, one or a plurality of secondary host computers 105, and one or a plurality of secondary management computers 107.

The primary storage apparatuses 2501 is coupled to the primary host computers 104, the primary management computers 106, and a WAN 140.

The configurations of the first secondary storage apparatus 2502 and the second secondary storage apparatus 2503 are equal or similar to the configuration of the secondary storage apparatus 103 of the embodiment 1. The first secondary storage apparatus 2502 and the second secondary storage apparatus 2503 are coupled to the secondary host computer 105, the secondary management computer 107, and the WAN 140.

Figure 27:
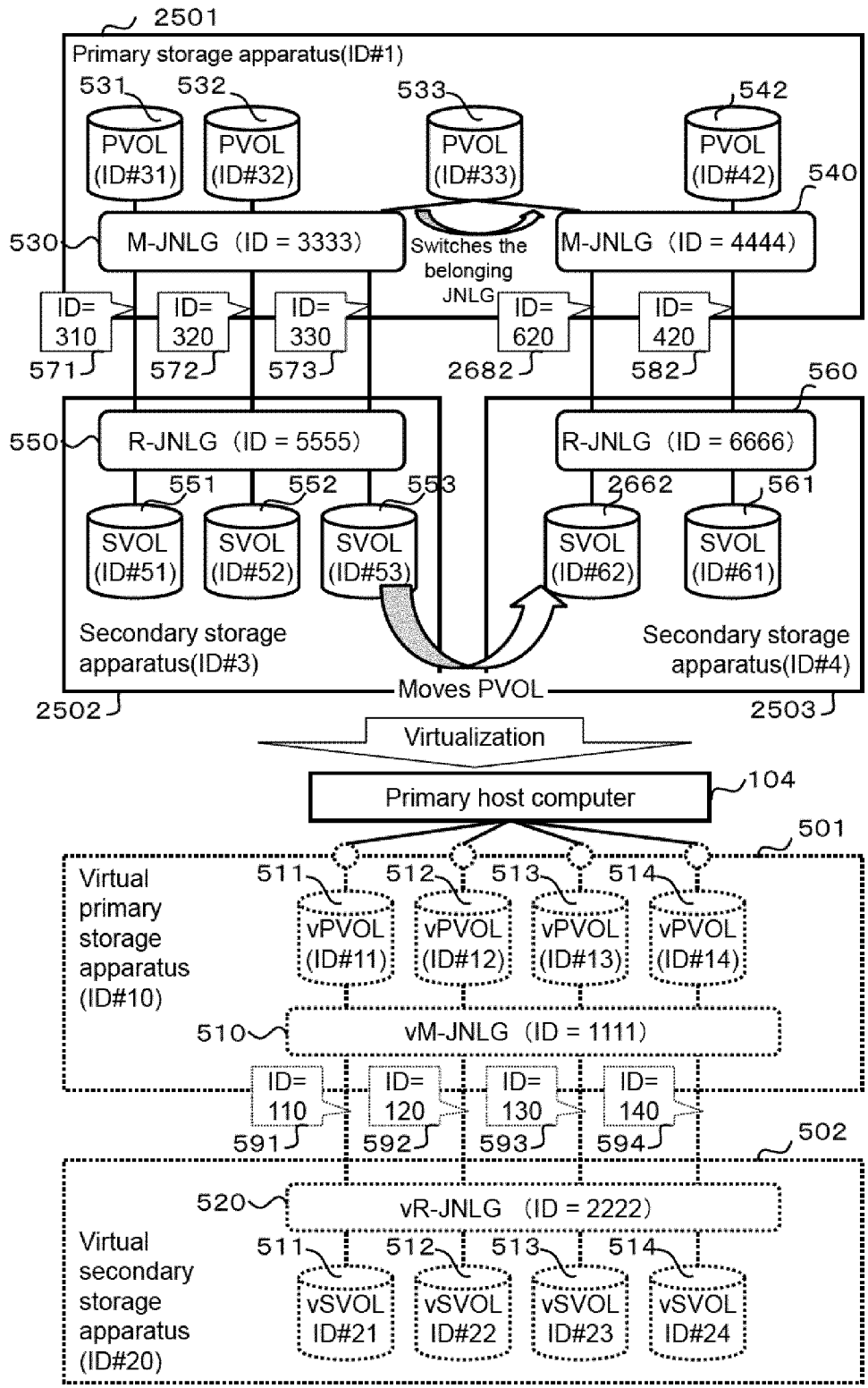
FIG. 27 is a view illustrating an outline of an operation of an embodiment 2.

FIG. 27 is a view illustrating an outline of an operation of an embodiment 2.

The PVOLs 531, 532, 533, and 542 and the M-JNLGs 530 and 540 belong to the primary storage apparatus 2501, the SVOLs 551, 552, and 553 and the R-JNLG 550 belong to the first secondary storage apparatus 2502, and the SVOL 561 and the R-JNLG 560 belong to the second secondary storage apparatus 2503. The other points are equal or similar to the initial configuration of FIG. 5.

In the case in which an SVOL (ID=53) 533 of the first secondary storage apparatus 2502 is moved to the second secondary storage apparatus 2503 by the movement transmission program 411 and the movement reception program 412, an SVOL (ID=61) 2662 is newly created to the second secondary storage apparatus 2503 and the data movement from the SVOL (ID=53) 533 is executed. After the data movement, a remote copy pair of a PVOL (ID=33) and an SVOL (ID=62) is formed. The virtualization of a storage apparatus is executed in order to hide the above modification to the primary host computer 104. This point is equal or similar to the embodiment 1.

Figure 28:
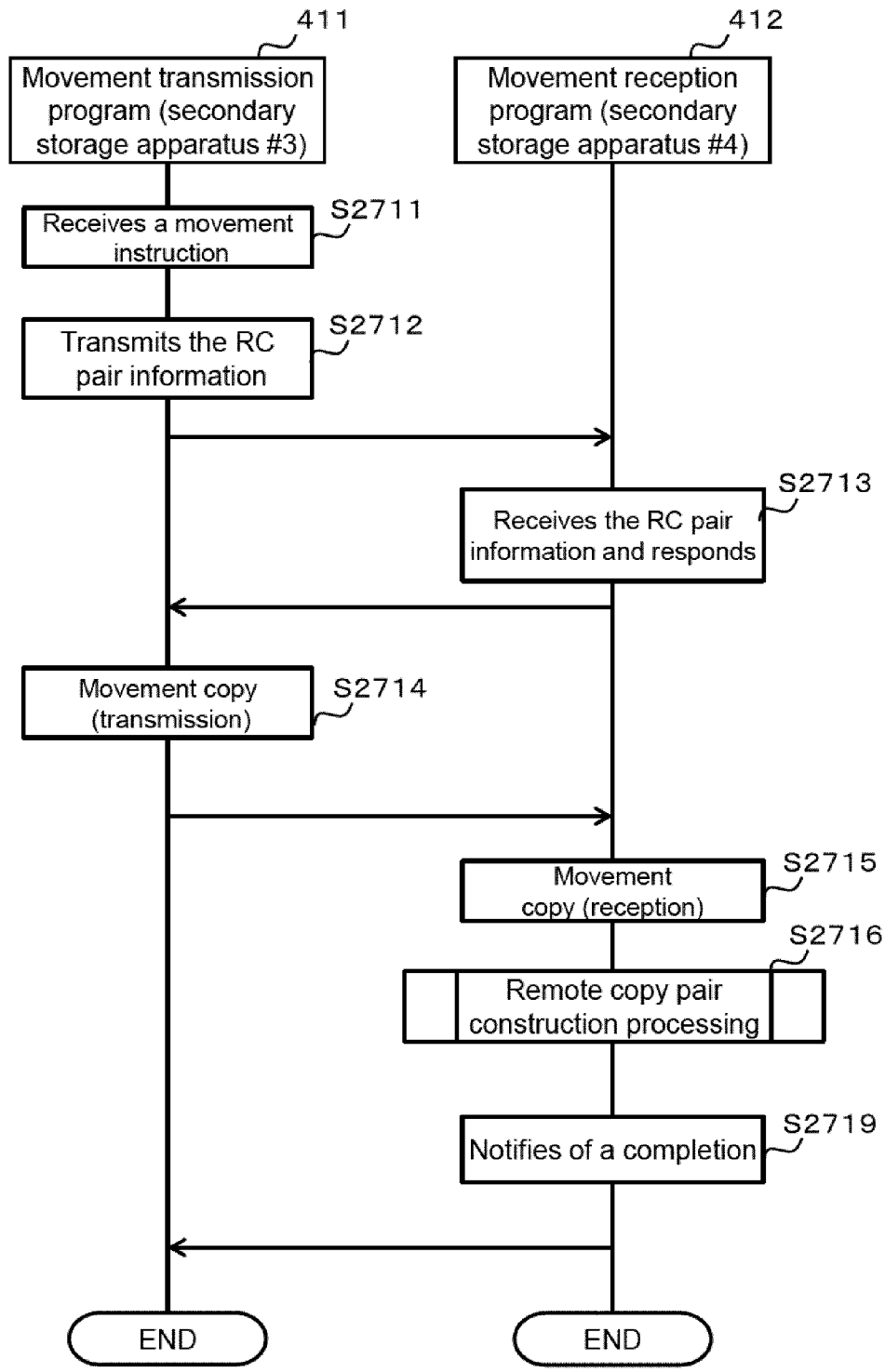
FIG. 28 is a flowchart of a data movement processing of a VOL between secondary storage apparatuses of an embodiment 2.

FIG. 28 is a flowchart of a data movement processing of a VOL between secondary storage apparatuses of an embodiment 2.

In the following descriptions, a data movement processing of a real VOL between a PVOL of the first secondary storage apparatus 2502 and a PVOL of the second secondary storage apparatus 2503 will be described. For instance, this processing is executed in the case in which the CPU 231 of the first secondary storage apparatus 2502 executes the movement transmission program 411 and the CPU 231 of the second secondary storage apparatus 2503 executes the movement reception program 412.

This processing is started at a moment when the management IF 242 of the first secondary storage apparatus 2502 receives a movement instruction that includes a VOL number of the secondary storage apparatus of a data movement target from the secondary management computer 107 for instance. However, this configuration is not restricted.

A table that is referred to or updated by a program of the storage apparatus is an own table in the storage apparatus.

Since the steps of S2711 to S2715 are equivalent or similar to the steps of S1911 to S1915 of FIG. 19, the descriptions of the steps are omitted. However, for those steps, the first primary storage apparatus 101 is changed to the first secondary storage apparatus 2502, the second primary storage apparatus 102 is changed to the second secondary storage apparatus 2503, and a PVOL is changed to an SVOL. In the present embodiment, the step S2714 can be a processing for starting a transmission of the VOL data of a movement source SVOL, and the step S2715 can be a processing for starting a reception of the VOL data of a movement source SVOL. In this case, a copy of the VOL data from the movement source SVOL to the movement destination SVOL can be continued until a restore restart instruction (S2912) described later in FIG. 30. Moreover in this case, the processing of the steps S2714 and S2715 can be an initial copy processing for copying the VOL data that has been stored in the movement source SVOL to the movement destination SVOL. In the case in which the processing of the steps S2714 and S2715 is made to be an initial copy processing, the VOL data that has been restored to the movement source SVOL during an execution of the initial copy processing or after a completion of the initial copy processing can be copied to the movement destination SVOL.

Figure 29:
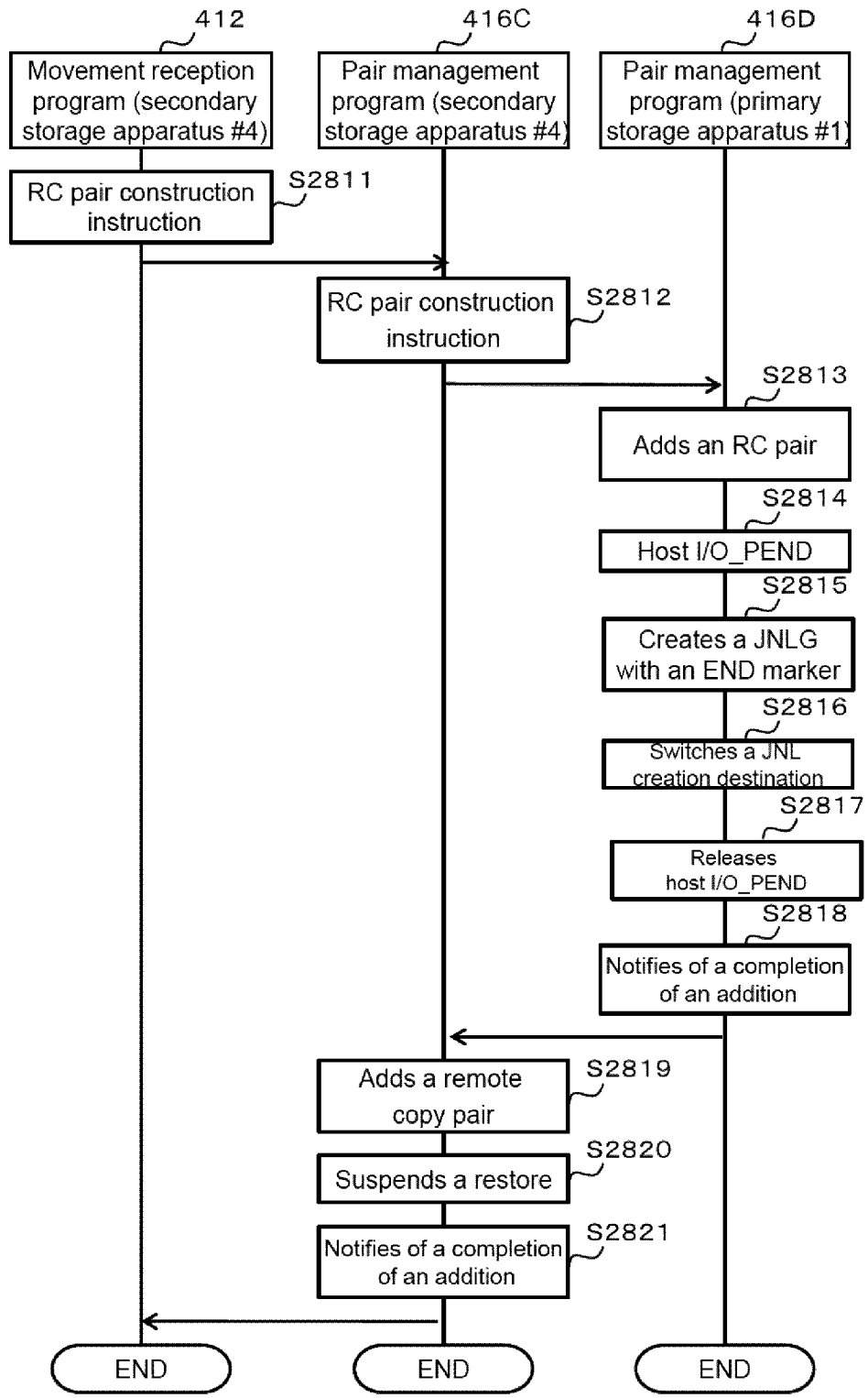
FIG. 29 is a flowchart of a remote copy pair construction processing of an embodiment 2.

(S2716) The movement reception program 412 executes a remote copy pair construction processing of a PVOL of the primary storage apparatus 2501 and an SVOL of the second secondary storage apparatus 2503. The details are shown in FIG. 29. By this processing, a remote copy pair is constructed.

(S2719) The movement reception program 412 notifies the first secondary storage apparatus 2503 of the completion of a movement of the real VOL data and a remote copy pair construction processing.

By the above processing, the real VOL data can be moved from the movement source SVOL of the first secondary storage apparatus 2502 to the movement destination SVOL of the second secondary storage apparatus 2503. Moreover, in accordance with a movement of the real VOL data, a PVOL that makes a remote copy pair with the movement source SVOL and the movement destination SVOL can be constructed as a new remote copy pair.

FIG. 29 is a flowchart of a remote copy pair construction processing of an embodiment 2.

This processing is a processing of the step S2716 of the data movement processing. For instance, this processing is executed in the case in which the CPU 231 of the second secondary storage apparatus 2503 executes the movement reception program 412 and the pair management program 416C and the CPU 231 of the primary storage apparatus 2501 executes the pair management program 416D. Moreover, this processing is started at a moment when the movement reception program 412 of the second secondary storage apparatus 2503 detects a completion of a movement copy for instance.

(S2811) The movement reception program 412 instructs the own pair management program 416B to construct a remote copy pair. More specifically for instance, the movement reception program 412 transmits a remote copy pair instruction for constructing a PVOL that configures a remote copy pair with an SVOL of a movement source and an SVOL of a movement destination as a new remote copy pair based on the remote copy pair that has been received in the step S2713. This instruction includes an instruction for making a restore flag to be "OFF". Moreover, this instruction can include a notice of that a copy to a movement destination SVOL of the VOL data of a movement source SVOL has been executed, more specifically, a notice of a completion of an initial copy processing.

(S2812) The pair management program 416C receives the remote copy pair instruction, and decides a real pair ID of a new remote copy pair, an S-JNLG number that is a destination to which an SVOL of a movement destination outputs a journal, and an M-JNLG number that is a destination to which the PVOL outputs a journal.

A real pair ID can be an arbitrary number and can also be decided by other methods. Moreover, the M-JNLG number and the R-JNLG number can be decided by any method. More specifically for instance, the M-JNLG number and the R-JNLG number can be decided by a user instruction. In the case in which there is another remote copy pair that belongs to the same virtual JNLG in the own storage apparatus, an M-JNLG and an R-JNLG to which the VOL belongs can also be used. Moreover, an M-JNLG and an R-JNLG in which a load of the CPU is small can also be used.

The pair management program 416C then transmits the remote copy pair construction instruction that includes a PVOL number and an SVOL number of a new remote copy pair, the real pair ID that has been decided in the present step, and the M-JNLG number and the R-JNLG number to the pair management program 416D of the primary storage apparatus 2501. The remote copy pair construction instruction includes an instruction for making a restore flag to be "OFF" and for making a pair status to be "PAIR". Moreover, this instruction can include a notice of that a copy to a movement destination SVOL of the VOL data of a movement source SVOL has been executed, more specifically, a notice of a completion of an initial copy processing.

(S2813) The pair management program 416D receives the remote copy pair construction instruction, and updates the real pair management table 432C. More specifically, the pair management program 412 updates a real pair number 811, a PVOL number 812, a real M-JNLG number 813, an SVOL number 815, a real R-JNLG number 816, and a pair status 817 based on the remote copy pair construction instruction. Moreover, the pair management program 416 updates a pair apparatus number 814, sets an invalid value to a JNL creation flag 818, and sets "OFF" to a JNL restore flag 819 based on the information with the second secondary storage apparatus 2502 of a transmission source.

(S2814) The pair management program 416D temporarily takes a pending action of an I/O from the host computer to a PVOL of a pair that has been added.

(S2815) The pair management program 416D updates the journal management table 439. More specifically for instance, the pair management program 416D creates an entry corresponded to the latest sequence number 1511 and makes the END marker 1516 to be "ON". The journal corresponded to the sequence number is a journal in which data does not exist.

(S2816) The pair management program 416D switches a journal creation destination of a PVOL of a remote copy pair that has been added to be a new JNLG that has been decided in the step S2812. At this time, after writing of a journal to a former JNLG is stopped, writing to a new JNLG is started.

(S2817) The pair management program 416D restarts an I/O reception from the host computer.

(S2818) The pair management program 416D transmits a remote copy pair addition completion notice as a response of the step S2812 to the second secondary storage apparatus 2503.

(S2819) The pair management program 416C receives a remote copy pair addition completion notice, and updates the real pair management table 432B. More specifically for instance, the pair management program 416C updates a real pair number 831, a PVOL number 832, a real M-JNLG number 833, an SVOL number 835, a real R-JNLG number 836, and a pair status 83. Moreover, the pair management program 416C sets an ID of the secondary storage apparatus 103 to a pair apparatus number 834, sets an invalid value to a JNL creation flag 838, and sets "OFF" to a JNL restore flag.

(S2820) The pair management program 416C suspends a restore of a remote copy pair that has been added to in the step S2819.

(S2821) The pair management program 416C transmits a remote copy pair addition completion notice as a response of the step S2811 to the movement reception program, and terminates the processing.

By the above processing, a new remote copy pair that is made of a PVOL and a movement destination SVOL can be added by an instruction of the second secondary storage apparatus 2503 to which a movement destination PVOL belongs. After adding the new remote copy pair, the second secondary storage apparatus 2503 temporarily suspends a restore from a JNLG that is corresponded to a movement destination SVOL to the movement destination SVOL. By this configuration, a restore from a JNLG corresponded to a movement destination SVOL to the movement destination SVOL can be prevented from being started before a restore from a JNLG corresponded to a movement source SVOL to the movement source SVOL is completed.

Figure 30:
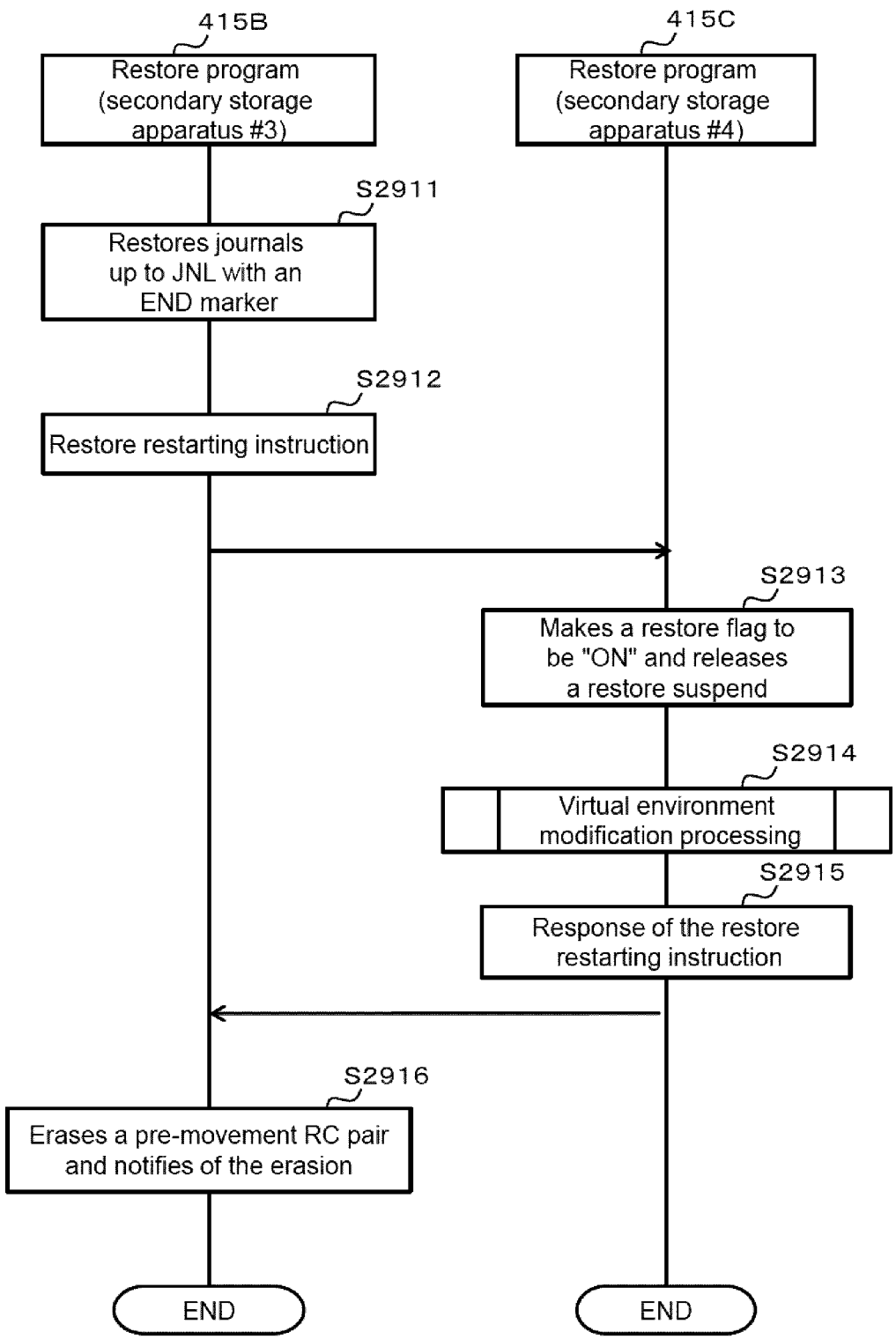
FIG. 30 is a flowchart of a restore processing of an embodiment 2.

FIG. 30 is a flowchart of a restore processing of an embodiment 2.

For instance, this processing is executed in the case in which the CPU 231 of the first secondary storage apparatus 2502 executes the restore program 415B and the CPU 231 of the second secondary storage apparatus 2503 executes the restore program 415C. Moreover, this processing is started at a moment when a certain time period elapses for a timer in the first secondary storage apparatus 2502 for instance. Moreover, a starting moment can also be arbitrary timing.

(S2911) The restore program 415B restores journals up to a journal to which an END marker has been imparted. More specifically for instance, the restore program 415B executes the processing of the steps S2211 to S2216 of FIG. 24. As described above, the VOL data that has been restored to the movement source SVOL during an execution of the initial copy processing or after a completion of the initial copy processing can be copied to the movement destination SVOL.

(S2912) The restore program 415B transmits an instruction of a restore suspend release to the restore program 415C of the second secondary storage apparatus 2503. The instruction of a restore suspend release can also be executed after a completion of a transmission of the VOL data of the movement source SVOL by the movement transmission program 411.

At this time, the restore program 415B transmits a value of a PVOL number 812 that is corresponded to the real pair number 811 from the real pair management table 432 based on a real pair number 1513 in which an END marker 1516 of the journal management table 439 is "ON".

(S2913) The restore program 415C refers to the real pair management table 432 and makes the JNL creation flag 818 that is corresponded to the PVOL number 812 that has been transmitted in the step S2912 to be "ON".

(S2914) The restore program 415C instructs the virtual control program 417 of each of the storage apparatuses 2501, 2502, and 2503 to execute the virtual environment modification processing (S2915) The restore program 415C transmits a response to the instruction of the step S2912 to the restore program 415B.

(S2916) The restore program 415A erases the pair information of the former remote copy pair, transmits a completion of the processing to the primary storage apparatus, and terminates the processing.

By the above processing, the consistency of data can be maintained for a restore to an SVOL of a journal by a remote copy pair before and after a movement of an SVOL. More specifically, by imparting an END marker to a journal, for a remote copy pair of a movement source SVOL that is corresponded to a journal with a marker to which an END marker has been imparted, journals before a journal with an END marker are restored for the journals of a restore target. After the restore, suspending a restore of a remote copy pair of a movement destination SVOL can be released.

For the above processing, before a restore restart instruction of the step S2912, the restore program 415B can transmit the VOL data in a movement source SVOL that has been restored to a movement destination SVOL of the secondary storage apparatus 2503. In this case for instance, the restore program 415B transmits a restore restart instruction when the transmission of the VOL data is completed. By this configuration, a movement from the data VOL of the first secondary storage apparatus 2502 to the data VOL of the second secondary storage apparatus 2503 can be exactly executed.

The primary storage sub system is corresponded to the primary storage system, and the secondary storage sub system is corresponded to the secondary storage system or the like.

The first primary storage apparatus is corresponded to the first primary storage apparatus 101, the secondary storage apparatus is corresponded to the secondary storage apparatus 103, and the second primary storage apparatus is corresponded to the second primary storage apparatus 102 or the like. Moreover, the first primary data volume is corresponded to PVOLs 531 to 533, the second primary data volume is corresponded to PVOLs 541 to 542, and the secondary data volume is corresponded to SVOLs 551 to 561 or the like. Moreover, the first primary journal group is corresponded to an M-JNLG 530, the second primary journal group is corresponded to an M-JNLG 540, the first secondary journal group is corresponded to an R-JNLG 550, and the second secondary journal group is corresponded to an R-JNLG 560 or the like.

The primary storage apparatus is corresponded to the primary storage apparatus 2501, the first secondary storage apparatus is corresponded to the first secondary storage apparatus 2502, and the second secondary storage apparatus is corresponded to the second secondary storage apparatus 2503 or the like. Moreover, the primary data volume is corresponded to a PVOL 533, the first primary data volume is corresponded to an SVOL 553, and the second secondary data volume is corresponded to an SVOL 2662 or the like. Moreover, the first primary journal group is corresponded to an M-JNLG 530, the second primary journal group is corresponded to an M-JNLG 540, the first secondary journal group is corresponded to an R-JNLG 550, and the second secondary journal group is corresponded to an R-JNLG 560 or the like.

While an embodiment in accordance with the present invention has been described above, the present invention is not restricted to the above embodiment, and it is obvious that various changes and modifications can be thus made without departing from the scope of the present invention.

The invention claimed is:

1. A storage system comprising:
a primary storage sub system being coupled to a host computer; and
a secondary storage sub system being coupled to the primary storage sub system,
the primary storage sub system being provided with a plurality of primary data volumes and the secondary storage sub system being provided with a plurality of secondary data volumes which respectively form a volume pair with the plurality of primary data volumes,
the primary storage sub system being configured to create a primary group including a plurality of data volumes which store write data transmitted from the host computer and a journal storage area which stores a journal including a sequence number for ensuring a write sequence of the write data,
the secondary storage sub system being configured to create a secondary group associated with the primary group,
the secondary group including a secondary journal storage area which stores a journal from the primary storage system and a plurality of secondary data volumes which are updated based on a journal in the secondary journal storage area,
the secondary storage sub system being configured to create an association of a first primary data volume included in a first primary group with a secondary data volume included in a first secondary group as a volume pair for an asynchronous copy,
the primary storage sub system being configured to:
execute a data copy from the first primary data volume to a second primary data volume which belongs to a second primary group;
write a marker which includes the sequence number and indicates a completion of the data copy into the journal storage area of the first primary group when the data copy is completed;

transmit a journal of the first primary group to a journal storage area which belongs to the first secondary group associated with the first primary group; and transmit a journal of the second primary group to a journal storage area which belongs to the second secondary group associated with the second primary group, and the secondary storage sub system being configured to:
- restore a journal of the first secondary group to the secondary data volume, terminate the restoration based on the marker; and
- switch a volume which makes a volume pair with the secondary data volume from the first primary data volume to the second primary data volume, modify a belonging of the secondary data volume from the first secondary group to the second secondary group, and restore a journal in the journal storage area of the second secondary group to the secondary data volume.

2. A storage system according to claim 1, wherein the primary storage sub system is provided with a first primary storage apparatus coupled to the host computer and a second primary storage apparatus coupled to the host computer and the first primary storage apparatus, wherein the first primary storage apparatus is provided with the first primary data volume and the second primary storage apparatus is provided with the second primary data volume, and wherein the first primary storage apparatus and the second primary storage apparatus is configured to supply a virtual storage apparatus based on the first primary storage apparatus and the second primary storage apparatus to the host computer and is configured to supply a virtual volume based on the first primary data volume and the second primary data volume to the host computer.

3. A storage system according to claim 2, wherein the second primary storage apparatus is configured to transmit a data copy completion notice to the first primary storage apparatus when data copy is completed, and wherein the first primary storage apparatus is configured to write the marker to a journal storage area of the first primary group when receiving the data copy completion notice.

4. A storage system according to claim 3, wherein the second primary storage apparatus is configured to transmit the pair switch information that indicates that the first primary data volume is switched to the second primary data volume to the secondary storage sub system after the data copy is completed, and wherein the secondary storage sub system is configured to:
- receive the pair switch information;
- execute switching a volume pair of the secondary data volume and modifying a belonging of the secondary data volume based on the pair switch information, suspend a restoration of a journal of the second secondary group to the secondary data volume; and
- release the suspension based on the marker.

5. A storage system according to claim 4, further comprising:

a management computer being coupled to the first primary storage apparatus and the second primary storage apparatus, wherein the first primary storage apparatus and the second primary storage apparatus are provided with the virtual group information for associating the first primary group with the second primary group as one virtual group, wherein the management computer is configured to transmit a synchronous ID configured to indicate a time point to the first primary storage apparatus and the second primary storage apparatus at a predetermined time interval, wherein the first primary storage apparatus is configured to create a journal configured to include a sequence number in the first primary group and the synchronous ID, wherein the second primary storage apparatus is configured to create a journal configured to include a sequence number in the second primary group and the synchronous ID, wherein the secondary storage sub system is configured to:
- transmit a first synchronous ID issued most late among the synchronous IDs included in a journal transmitted to the first secondary group and a second synchronous ID issued most late among the synchronous IDs included in a journal transmitted to the second secondary group to the management computer, and wherein the management computer is configured to:
- receive the first synchronous ID and the second synchronous ID, determine a synchronous ID issued earliest among the first synchronous ID and the second synchronous ID as a restorable synchronous ID, and transmit a journal includes the restorable synchronous ID to the secondary storage sub system.

6. A storage system comprising:

a primary storage sub system being coupled to a host computer; and a secondary storage sub system being coupled to the primary storage sub system, the primary storage sub system being provided with a plurality of primary data volumes and the secondary storage sub system being provided with a plurality of secondary data volumes which respectively form a volume pair with the plurality of primary data volumes, the primary storage sub system being configured to create a primary group including a plurality of data volumes which store write data transmitted from the host computer and a journal storage area which stores a journal including a sequence number for ensuring a write sequence of the write data, the secondary storage sub system being configured to create a secondary group associated with the primary group, the secondary group including a secondary journal storage area which stores a journal from the primary storage system and a plurality of secondary data volumes which are updated based on a journal in the secondary journal storage area, the secondary storage sub system being configured to create an association of a primary data volume included in a first primary group with a first secondary data volume included in a first secondary group as a volume pair for an asynchronous copy, the secondary storage sub system being configured to:
- execute a data copy from a first secondary data volume which belongs to the first secondary group to a second secondary data volume configured to belong to the second secondary group; and
transmit a data copy execution notice that indicates that the data copy has been executed to the primary storage sub system when the data copy is executed,
the primary storage sub system being configured to:
write a marker that is a journal that indicates that the data copy has been executed to a journal storage area of the first primary group when the data copy execution notice is received;
modify a belonging of the primary data volume from the first primary group associated with the first secondary group to the second primary group associated with the second secondary group, write a journal based on the write data to the primary data volume into a journal storage area of the second primary group;
transmit a journal of the first primary group to a journal storage area which belongs to the first secondary group; and
transmit a journal of the second primary group to a journal storage area which belongs to the second secondary group, and
the secondary storage sub system being configured to:
restore a journal of the first secondary group to the first secondary data volume, terminate the restoration based on the marker; and
switch a volume which makes a volume pair with the primary data volume from the first secondary data volume to the second secondary data volume after the data copy is completed, and restore a journal of the second secondary group to the second secondary data volume.

7. A storage system according to claim 6,
wherein the second secondary storage apparatus is configured to transmit the pair switch information that indicates that the first secondary data volume is switched to the second secondary data volume to the primary storage sub system when the data copy is executed,
wherein the primary storage sub system is configured to: receive the pair switch information; and
execute switching a volume pair of the primary data volume and a pair switch processing that is a processing for modifying a belonging of the secondary data volume based on the pair switch information, and notify the second secondary storage apparatus of the completion of the pair switch processing, and
wherein the second secondary storage apparatus is configured to:
receive a notice of the pair switch processing;
suspend a restoration of a journal of the second secondary group to the secondary data volume; and
release the suspension of the restoration after the data copy is completed.

8. A storage system according to claim 7, further comprising:
a management computer coupled to the primary storage sub system,
wherein the first secondary storage apparatus and the second secondary storage apparatus are provided with the virtual group information for associating the first secondary group and the second secondary group as one virtual group,
wherein the management computer is configured to transmit a synchronous ID indicates a time point to the primary storage sub system at every predetermined time interval,
wherein the primary storage sub system is configured to:
create a journal includes a sequence number in the first primary group and the synchronous ID; and
create a journal includes a sequence number in the second primary group and the synchronous ID,
wherein the secondary storage sub system is configured to:
transmit a third synchronous ID issued most late among the synchronous IDs included in a journal transmitted to the first secondary group and a fourth synchronous ID issued most late among the synchronous IDs included in a journal transmitted to the second secondary group to the management computer, and
wherein the management computer is configured to:
receive the third synchronous ID and the fourth synchronous ID, determine a synchronous ID issued earliest among the third synchronous ID and the fourth synchronous as a restorable synchronous ID, and transmit a journal includes the restorable synchronous ID to the secondary storage sub system.

9. A control method of a storage system comprising:
a primary storage sub system being coupled to a host computer; and
a secondary storage sub system being coupled to the primary storage sub system,
the primary storage sub system being provided with a plurality of primary data volumes and the secondary storage sub system being provided with a plurality of secondary data volumes which respectively form a volume pair with the plurality of primary data volumes,
the primary storage sub system being configured to create a primary group including a plurality of data volumes which store write data transmitted from the host computer and a journal storage area which stores a journal including a sequence number ensures a write sequence of the write data,
the secondary storage sub system being configured to create a secondary group associated with the primary group,
the secondary group including a secondary journal storage area which stores a journal from the primary storage system and a plurality of secondary data volumes which are updated based on a journal in the secondary journal storage area,
the secondary storage sub system being configured to create an association of a first primary data volume included in a first primary group with a secondary data volume included in a first secondary group as a volume pair for an asynchronous copy,
the primary storage sub system being configured to:
execute a data copy from the first primary data volume to a second primary data volume which belongs to a second primary group;
write a marker which includes the sequence number and indicates a completion of the data copy into the journal storage area of the first primary group when the data copy is completed;
transmit a journal of the first primary group to a journal storage area which belongs to the first secondary group associated with the first primary group; and
transmit a journal of the second primary group to a journal storage area which belongs to the second secondary group associated with the second primary group, and
the secondary storage sub system being configured to:

restore a journal of the first secondary group to the secondary data volume, terminate the restoration based on the marker; and switch a volume which makes a volume pair with the secondary data volume from the first primary data volume to the second primary data volume, modify a belonging of the secondary data volume from the first secondary group to the second secondary group, and restore a journal in the journal storage area of the second secondary group to the secondary data volume.

\* \* \* \* \*